(12) United States Patent
Kim et al.

(10) Patent No.: US 9,860,549 B2
(45) Date of Patent: Jan. 2, 2018

(54) INTER-LAYER PREDICTION METHOD AND ENCODING DEVICE AND DECODING DEVICE USING SAME

(71) Applicant: LG ELECTRONICS INC., Seoul (KR)

(72) Inventors: Chulkeun Kim, Seoul (KR); Byeongmoon Jeon, Seoul (KR); Seungwook Park, Seoul (KR); Jaehyun Lim, Seoul (KR); Yongjoon Jeon, Seoul (KR); Joonyoung Park, Seoul (KR); Naeri Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 317 days.

(21) Appl. No.: 14/386,273

(22) PCT Filed: Mar. 29, 2013

(86) PCT No.: PCT/KR2013/002653
§ 371 (c)(1),
(2) Date: Sep. 18, 2014

(87) PCT Pub. No.: WO2013/147557
PCT Pub. Date: Oct. 3, 2013

(65) Prior Publication Data
US 2015/0103896 A1    Apr. 16, 2015

Related U.S. Application Data
(60) Provisional application No. 61/617,053, filed on Mar. 29, 2012.

(51) Int. Cl.
*H04N 7/12*    (2006.01)
*H04N 19/503*    (2014.01)
(Continued)

(52) U.S. Cl.
CPC .......... *H04N 19/503* (2014.11); *H04N 19/33* (2014.11); *H04N 19/52* (2014.11); *H04N 19/59* (2014.11);
(Continued)

(58) Field of Classification Search
CPC .................................................. H04N 19/503
See application file for complete search history.

(56) References Cited

U.S. PATENT DOCUMENTS

| | | | | |
|---|---|---|---|---|
| 6,011,872 A | * | 1/2000 | Qian | G06T 3/40 375/E7.081 |
| 2001/0048447 A1 | * | 12/2001 | Jogo | G06T 11/60 345/620 |

(Continued)

FOREIGN PATENT DOCUMENTS

| | | |
|---|---|---|
| KR | 10-2007-0076504 A | 7/2007 |
| KR | 10-2008-0073157 A | 8/2008 |

(Continued)

OTHER PUBLICATIONS
Anonymous: "Study of ISO/IEC 14496-10:2009/DCOR 1", 90, MPEG Meeting, Oct. 26, 2009-Oct. 30, 2009; XIAN, (Motion Picture Expert Group or ISO/IEC JTC1/SC29/WG11), No. N10898, Nov. 18, 2009, XP030017397.

*Primary Examiner* — Tracy Y Li
(74) *Attorney, Agent, or Firm* — Dentons US LLP

(57) ABSTRACT

The present invention relates to an inter-layer prediction method, and an encoder and a decoder using the same, the inter-layer prediction method including specifying a reference block in a reference layer and predicting a current block in a current layer using information on the reference block, wherein the specifying of the reference block includes specifying the reference block on the basis of a reference position which is a position in the reference layer corresponding to a current position in the current layer for specifying the current block.

12 Claims, 13 Drawing Sheets

(51) Int. Cl.
  *H04N 19/52* (2014.01)
  *H04N 19/33* (2014.01)
  *H04N 19/59* (2014.01)
  *H04N 19/105* (2014.01)
  *H04N 19/176* (2014.01)
  *H04N 19/157* (2014.01)
  *H04N 19/187* (2014.01)
(52) U.S. Cl.
  CPC .......... *H04N 19/105* (2014.11); *H04N 19/157* (2014.11); *H04N 19/176* (2014.11); *H04N 19/187* (2014.11)

(56) References Cited

U.S. PATENT DOCUMENTS

| | | | |
|---|---|---|---|
| 2006/0209959 A1 | 9/2006 | Sun | |
| 2006/0222067 A1* | 10/2006 | Park | H04N 19/105 375/240.08 |
| 2007/0086520 A1* | 4/2007 | Kim | H04N 19/105 375/240.1 |
| 2008/0165848 A1* | 7/2008 | Ye | H04N 19/105 375/240.13 |
| 2008/0225952 A1* | 9/2008 | Wang | H04N 19/105 375/240.16 |
| 2009/0028245 A1 | 1/2009 | Vieron et al. | |
| 2009/0060034 A1* | 3/2009 | Park | H04N 19/105 375/240.12 |
| 2010/0002069 A1* | 1/2010 | Eleftheriadis | H04N 7/152 348/14.08 |
| 2010/0215095 A1* | 8/2010 | Hayase | H04N 19/105 375/240.02 |
| 2011/0107390 A1* | 5/2011 | Shen | H04N 19/61 725/151 |

FOREIGN PATENT DOCUMENTS

| | | |
|---|---|---|
| KR | 10-2010-0010612 A | 2/2010 |
| KR | 10-2010-0027384 A | 3/2010 |
| KR | 10-2010-0066560 A | 6/2010 |
| KR | 10-2011-0052203 A | 5/2011 |

* cited by examiner

INTER-LAYER PREDICTION METHOD AND ENCODING DEVICE AND DECODING DEVICE USING SAME

This application is a National Stage Entry of International Application No. PCT/KR2013/002653, filed Mar. 29, 2013, and claims the benefit of U.S. Provisional Application No. 61/617,053, filed Mar. 29, 2012, both of which are hereby incorporated by reference for all purposes as if fully set forth herein in their entireties.

TECHNICAL FIELD

The present invention relates to a video compression technique, and more particularly, to an inter-layer prediction method in scalable video coding.

BACKGROUND ART

In recent years, demands for high-resolution and high-quality videos have increased more and more in various fields of applications. As pictures have higher resolution and higher quality, the amount of information on the pictures also increases.

With the increase in the amount of data, multi-functional devices and networks with various environments are introduced.

With the development of the apparatuses having a variety of performance and the networks having various environments, the same contents may be used with different levels of quality.

Specifically, as terminals are able to support diverse qualities of pictures and various network environments are established, a picture with general quality is enabled in one environment while a higher-quality picture may be available in another environment.

For example, a user having purchased video contents through a mobile terminal can enjoy the video contents on a large-screen display with a higher resolution at his or her home.

In recent years, as high definition (HD) broadcast services are available, a large number of users are getting used to high-resolution and high-quality videos and service providers and service users also pay attention to ultrahigh-definition (UHD) services having a resolution four times higher than HDTV.

Thus, there is a need to provide scalability to video quality, for example, the image quality, resolution, size and frame rate of a video, based on high-efficiency encoding and decoding methods on a high-capacity video so as to offer varied qualities of video services in different environments for users' demands.

SUMMARY OF THE INVENTION

Technical Problems

An object of the invention is to provide a method and an apparatus capable of effectively performing inter-layer prediction in scalable video coding.

Another object of the invention is to provide a method and an apparatus capable of accurately specifying a matching relationship between different layers in inter-layer prediction.

Still another object of the invention is to provide a method and an apparatus capable of accurately specifying a matching relationship between different layers when a layer has a size which is not a multiple of a size of a smallest coding unit (SCU), thereby effectively performing inter-layer prediction.

Still another object of the invention is to provide a method and an apparatus which specify a reference block in a reference layer corresponding to a current block in a current layer.

Solution to Problems

According to an aspect of the invention, there is provided an inter-layer prediction method including specifying a reference block in a reference layer and predicting a current block in a current layer using information on the reference block, wherein the specifying of the reference block includes specifying the reference block on the basis of a reference position which is a position in the reference layer corresponding to a current position in the current layer for specifying the current block.

According to another aspect of the invention, there is provided a decoder including a reception module to receive a bit stream comprising video information on a multilayer, a prediction module to perform prediction for a video of a current layer using video information on a reference layer, and a memory to store information necessary for the prediction, wherein the prediction module predicts a current block using information on a reference block in the reference layer, and the reference block is specified on the basis of a reference position which is a position in the reference layer corresponding to a current position in the current layer for specifying the current block.

According to still another aspect of the invention, there is provided an encoder including a prediction module to perform prediction for a video of a current layer using video information on a reference layer, a memory to store information necessary for the prediction, and a transmission module to transmit a bit stream of a multilayer comprising predicted information, wherein the prediction module predicts a current block using information on a reference block in the reference layer, and the reference block is specified on the basis of a reference position which is a position in the reference layer corresponding to a current position in the current layer for specifying the current block.

Advantageous Effects

According to the invention, it is possible to effectively perform inter-layer prediction in scalable video coding.

According to the invention, it is possible to accurately specify a matching relationship between different layers in inter-layer prediction.

According to the invention, it is possible to accurately specify a matching relationship between different layers when a layer has a size which is not a multiple of a size of a smallest coding unit (SCU), thereby effectively performing inter-layer prediction.

According to the invention, it is possible to specify a reference block in a reference layer corresponding to a current block in a current layer.

DESCRIPTION OF EMBODIMENTS

Figure 1:
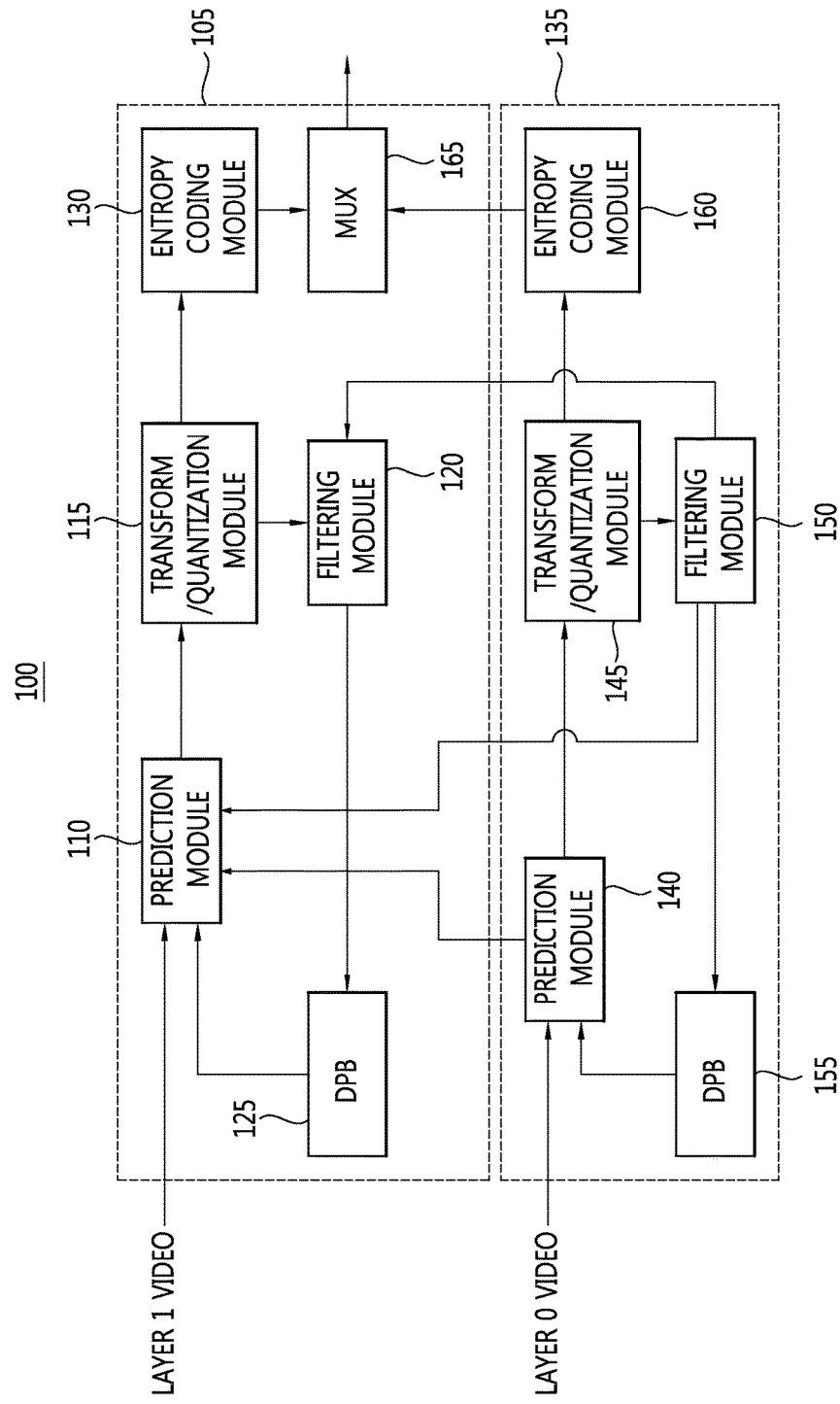
FIG. 1 is a block diagram schematically illustrating a video encoder that supports scalability according to an embodiment of the invention.

The present invention can be variously modified in various forms, and specific embodiments thereof will be described and shown in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions in an image encoding/decoding apparatus and does not mean that the elements are embodied by independent hardware or independent software. For example, two or more elements of the elements may be combined to form a single element, or one element may be divided into plural elements. The embodiments in which the elements are combined and/or divided belong to the scope of the invention without departing from the concept of the invention.

Hereinafter, exemplary embodiments of the invention will be described in detail with reference to the accompanying drawings. Like constituents in the drawings will be referenced by like reference numerals and will not be repeatedly described.

In a video coding method that supports scalability (hereinafter, referred to as "scalable coding"), input signals can be processed by layers. Depending on the layers, the input signals (input videos) may be different from each other in at least one of a resolution, a frame rate, a bit depth, a color format, and an aspect ratio.

In this description, scalable coding includes scalable encoding and scalable decoding.

In scalable encoding/decoding, it is possible to reduce duplicate transmission/processing of information and to enhance compression efficiency by performing inter-layer prediction using an inter-layer difference, that is, on the basis of scalability.

FIG. 1 is a block diagram schematically illustrating a video encoder that supports scalability according to an embodiment of the invention.

Referring to FIG. 1, the video encoder 100 includes an encoding module 105 for layer 1 and an encoding module 135 for layer 0.

Layer 0 may be a base layer, a reference layer or a lower layer, and layer 1 may be an enhancement layer, a current layer or an upper layer.

The encoding module 105 for layer 1 includes a prediction module 110, a transform/quantization module 115, a filtering module 120, a decoded picture buffer (DPB) 125, an entropy coding module 130, and a multiplexer (MUX) 165.

The encoding module 135 for layer 0 includes a prediction module 140, a transform/quantization module 145, a filtering module 150, a DPB 155, and an entropy coding module 160.

The prediction modules 110 and 140 may perform inter prediction and intra prediction on an input video. The prediction modules 110 and 140 may perform the predictions by predetermined processing units. The processing unit for prediction may be a coding unit (CU), a prediction unit (PU), or may be a transform unit (TU).

For example, the prediction modules 110 and 140 may determine whether to conduct inter prediction or intra prediction by CU, may determine a prediction mode by PU, and may perform prediction by PU or TU. Prediction to be performed includes construction of a predicted block and construction of a residual block (residual signal).

In the inter prediction, the prediction may be performed on the basis of information on at least one of a previous picture and/or a subsequent picture of a current picture to construct a predicted block. In the intra prediction, the prediction may be performed on the basis of information on a pixel in a current picture to construct a predicted block.

Examples of an inter prediction mode or method include a skip mode, a merge mode, a motion vector prediction (MVP) method. In the inter prediction, a reference picture for a current PU to be predicted may be selected and a reference block corresponding to the current PU may be selected from the reference picture. The prediction modules 110 and 140 may construct a predicted block on the basis of the reference block.

The predicted block may be constructed as an integer sample unit or as a fractional pixel unit. Here, a motion vector may also be represented in a fractional pixel.

Motion information in the inter prediction, that is, information such as an index, a motion vector and a residual signal of a reference picture, is entropy-encoded and is transmitted to a video decoder. When a skip mode is applied, the residual signal may not be created, transformed, quantized, and transmitted at all.

Prediction modes in the intra prediction may include 33 directional prediction modes and at least two non-directional modes. The non-directional modes may include a DC prediction mode and a planar mode. In the intra prediction, a predicted block may be constructed after a filter is applied to a reference sample.

A PU may be a block with various sizes and shapes. For example, in inter prediction, a PU may be a 2N×2N, 2N×N, N×2N or N×N block (where N is an integer). In intra prediction, a PU may be a 2N×2N or N×N block (where N is an integer). A PU with a size of N×N may be set to be applied only to a specific case. For example, the PU with the size of N×N may be set to be used only for a smallest CU or only for intra prediction. In addition to the PUs with the above-mentioned sizes, a PU may be further defined as an N×mN block, an mN×N block, a 2N×mN block, or an mN×2N block (where m<1) for use.

The prediction modules 110 and 140 may perform prediction for layer 1 using information on layer 0. In this specification, a process of predicting current layer information using another layer information is defined as an inter-layer prediction for convenience.

The current layer information predicted using the other layer information (that is, predicted by the inter-layer prediction) may include a texture, motion information, unit information, a predetermined parameter (for example, a filtering parameter), or the like.

The other layer information used for predicting the current layer information (that is, used for the inter-layer prediction) may include a texture, motion information, unit information, a predetermined parameter (for example, a filtering parameter), or the like.

As an example of the inter-layer prediction, an inter-layer unit parameter prediction may derive unit (CU, PU and/or TU) information on a base layer to be used as unit information on an enhancement layer or to determine unit information on an enhancement layer based on the unit information on the base layer.

Unit information may include information in each unit level. For instance, CU information may include information on partition (CU, PU and/or TU), information on transformation, information on prediction, and information on coding. PU information may include information on PU partition and information on prediction (for example, motion information and information on a prediction mode). TU information may include information on TU partition and information on transformation (transform coefficients and transform methods).

Unit information may include only partition information on a processing unit (for example, CU, PU, TU, etc.).

As another example of the inter-layer prediction, an inter-layer motion prediction is also referred to as an inter-layer inter prediction. According to the inter-layer inter prediction, prediction for a current block of layer 1 (current layer or enhancement layer) may be carried out using motion information on layer 0 (reference layer or base layer).

When the inter-layer inter prediction is employed, motion information on a reference layer may be scaled.

As still another example of the inter-layer prediction, an inter-layer texture prediction is also referred to as an inter-layer intra prediction or intra base layer (BL) prediction. The inter-layer texture prediction may use a texture of a reference block in a reference layer as a predictive value for a current block in an enhancement layer. Here, the texture of the reference block may be scaled by upsampling.

As yet another example of the inter-layer prediction, an inter-layer parameter prediction may derive a parameter used in a base layer to be reused in an enhancement layer or may predict a parameter for the enhancement layer based on the parameter used in the base layer.

Although the inter-layer texture prediction, the inter-layer motion prediction, the inter-layer unit information prediction and the inter-layer parameter prediction have been illustrated above as an inter-layer prediction, alternative inter-layer predictions may also be applicable to the present invention, without limiting thereto.

For example, the prediction modules may conduct an inter-layer residual prediction of predicting a residual of a current layer using residual information on another layer and performing prediction for a current block in the current layer based on the residual.

Further, the prediction modules may conduct an inter-layer differential prediction of performing prediction for a current block in a current layer using a differential picture between pictures obtained by upsampling or downsampling a reconstructed picture of the current layer and a reconstructed picture of another layer.

The transform/quantization modules 115 and 145 may transform the residual block by TU to create transform coefficients and may quantize the transform coefficients.

A transform block is a rectangular block of samples to which the same transformation is applied. The transform block may be a TU and may have a quad-tree structure.

The transform/quantization modules 115 and 145 may perform transformation based on a prediction mode applied to the residual block and a size of the transform block and a size of the transform block to create a two-dimensional (2D) array of transform coefficients. For example, when intra prediction is applied to the residual block and the residual block has a 4×4 array, the residual block may be transformed using discrete sine transform (DST). Otherwise, the residual block may be transformed using discrete cosine transform (DCT).

The transform/quantization modules 115 and 145 may fixedly use a specific transformation regardless of a prediction mode and the size of the transform block. For example, the transform/quantization modules 115 and 1645 may apply only DST to all transform blocks. Alternatively, the transform/quantization modules 145 may apply only DCT to all transform blocks.

The transform/quantization modules 115 and 145 may quantize the transform coefficients to create the quantized transform coefficients.

The transform/quantization modules 115 and 145 may transmit the quantized transform coefficients to the entropy coding modules 130 and 160. Here, the transform/quantization modules 115 and 145 may rearrange the 2D array of the quantized transform coefficients into a one-dimensional (1D) array in a predetermined scan order and may transmit the rearranged 1D array to the entropy coding modules 130 and 160. The transform/quantization modules 115 and 145 may transmit a reconstructed block generated on the basis of the residual block and the predicted block to the filtering modules 120 and 150 for inter prediction, without being transformation/quantization.

If necessary, the transform/quantization modules 115 and 145 may skip transformation and perform only quantization or may skip both transformation and quantization. For example, the transform/quantization modules 115 and 145 may skip transformation for a block involving a specific prediction method or having a specific size, or a block involving a specific prediction block and having a specific size.

The entropy coding modules 130 and 180 may perform entropy encoding on the quantized transform coefficients. An encoding method, such as exponential Golomb coding and context-adaptive binary arithmetic coding (CABAC), may be used for entropy encoding.

The filtering modules 120 and 150 may apply a deblocking filter, an adaptive loop filter (ALF), or a sample adaptive offset (SAO) to a reconstructed picture.

The deblocking filter may remove a block distortion generated on boundaries between blocks in the reconstructed picture. The ALF may perform a filtering process on the basis of a resulting value of comparing the original picture with the reconstructed picture of which the blocks are filtered by the deblocking filter. The SAO may reconstruct an offset difference by pixel between the residual block having been subjected to the deblocking filter and the original picture and is applied in a form of a band offset, an edge offset, or the like.

The filtering modules 120 and 150 may not apply all of the deblocking filter, the ALF and the SAO, but may apply only the deblocking filter, may apply only the deblocking filter and the ALF, or may apply only the deblocking filter and the SAO.

The DPBs 125 and 155 may receive and store the reconstructed block or the reconstructed picture from the filtering modules 125 and 150. The DPB 125 and 155 may provide the reconstructed block or picture to the prediction modules 110 and 140 that perform inter prediction.

Information output from the entropy coding module 160 for layer 0 and information output from the entropy coding module 130 for layer 1 may be multiplexed by the MUX 165 and may be output as a bitstream.

Although the encoding module 105 for layer 1 has been described to include the MUX 165 for convenience, the MUX may be a device or module independent of the encoding module 105 for layer 1 and the encoding module 135 for layer 0.

Figure 2:
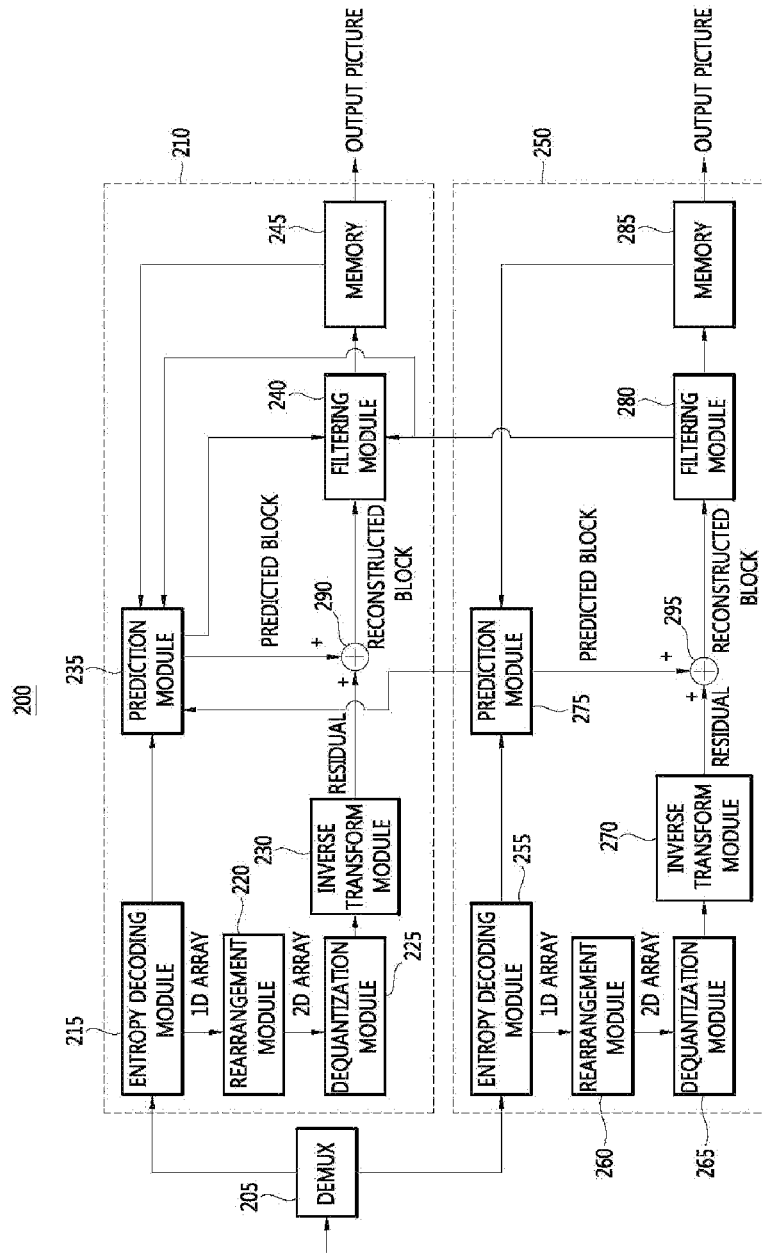
FIG. 2 is a block diagram schematically illustrating a video decoder that supports scalability according to an embodiment of the invention.

FIG. 2 is a block diagram schematically illustrating a video decoder that supports scalability according to an embodiment of the invention.

Referring to FIG. 2, the video decoder 200 includes a decoding module 210 for layer 1 and a decoding module 250 for layer 0.

Layer 0 may be a base layer, a reference layer or a lower layer, and layer 1 may be an enhancement layer, a current layer or an upper layer.

The decoding module 210 for layer 1 may include an entropy decoding module 215, a rearrangement module 220, a dequantization module 225, an inverse transform module 230, a prediction module 235, a filtering module 240, and a memory 245.

The decoding module 250 for layer 0 may include an entropy decoding module 255, a rearrangement module 260, a dequantization module 265, an inverse transform module 270, a prediction module 275, a filtering module 280, and a memory 285.

When a bitstream including video information is transmitted from the video encoder, a demultiplexer (DEMUX) 305 may demultiplex the information by layers and may transmit the information to decoders by layers.

The entropy decoding modules 215 and 255 may perform entropy decoding corresponding to an entropy coding method used in the video encoder. For example, when CABAC is used in the video encoder, the entropy decoding modules 215 and 255 may perform entropy decoding using CABAC.

Information for constructing a predicted block out of information decoded by the entropy decoding modules 215 and 255 may be provided to the prediction modules 235 and 275, and residual values entropy-decoded by the entropy decoding modules 215 and 255, that is, quantized transform coefficients, may be input to the rearrangement modules 220 and 260.

The rearrangement modules 220 and 260 may rearrange the information of the bitstream entropy-decoded by the entropy decoding modules 215 and 255, that is, the quantized transform coefficients, on the basis of a rearrangement method used in the video encoder.

For example, the rearrangement modules 220 and 260 may rearrange a 1D array of the quantized transform coefficients back into a 2D array of coefficients. The rearrangement modules 220 and 260 may perform scanning on the basis of a prediction mode applied to a current block (transform block) and/or a size of the transform block to construct a 2D array of coefficients (quantized transform coefficients).

The dequantization modules 225 and 265 may perform dequantization on the basis of a quantization parameter transmitted from the video encoder and the rearranged coefficients of the block to create transform coefficients.

The dequantization modules 225 and 265 may transmit the entropy-decoded residual values to the inverse transform modules 230 and 270, without dequantizing the residual values, depending on a predetermined condition or depending on a quantization method used for the video encoder.

The inverse transform modules 230 and 270 may perform inverse transformation of transformation performed by a transform module of the video encoder on the transform coefficients. The inverse transform modules 230 and 270 may perform inverse DCT and/or inverse DST of DCT and DST performed by the video encoder.

In the video encoder, DCT and/or DST may be selectively performed depending on a plurality of information pieces, such as a prediction method, a size of a current block and a prediction direction, and the inverse transform modules 230 and 270 of the video decoder may perform inverse transformation on the basis of transform information used by the video decoder.

For example, the inverse transform modules 230 and 270 may perform inverse DCT and inverse DST depending on a prediction mode/block size. Specifically, the inverse transform modules 230 and 270 may perform inverse DST on a 4×4 luma block to which intra prediction has been applied.

Alternatively, the inverse transform modules 230 and 270 may fixedly use a specific inverse transformation method regardless of a prediction mode/block size. For example, the inverse transform modules 230 and 270 may apply only inverse DST to all transform blocks. The inverse transform modules 230 and 270 may also apply only inverse DCT to all transform blocks.

The inverse transform modules 230 and 270 may inversely transform the transform coefficients or a block of the transform coefficients to construct a residual signal or a residual block.

The inverse transform modules 230 and 270 may skip transformation if necessary or depending on an encoding method used for the video encoder. For example, the inverse transform modules 230 and 270 may skip transformation for a block involving a specific prediction method or having a specific size, or a block involving a specific prediction block and having a specific size.

The prediction modules 235 and 275 may construct a predicted block of the current block on the basis of predicted block construction information provided from the entropy decoding modules 215 and 255 and information on a previously decoded block and/or picture provided from the memories 245 and 285.

When a prediction mode for the current block is an intra prediction mode, the prediction modules 235 and 275 may perform intra prediction on the current block on the basis of information on a pixel in a current picture.

When the prediction mode for the current block is an inter prediction mode, the prediction modules 235 and 275 may perform inter prediction on the current block on the basis of information included in at least one of a previous picture and a subsequent picture of the current picture. Part or all of motion information necessary for inter prediction may be derived based on information received from the video encoder.

When the skip mode is used as an inter prediction mode, the residual may not be transmitted from the video encoder and the predicted block may be used as a reconstructed block.

The prediction module 235 for layer 1 may perform inter prediction or intra prediction using only information in layer 1 and may perform inter-layer prediction using information on another layer (layer 0).

For instance, the prediction module 235 for layer 1 may perform prediction for the current block using one of motion information on layer 1, texture information on layer 1, unit information on layer 1 and parameter information on layer 1. The prediction module 235 for layer 1 may also perform prediction for the current block using a plurality of information pieces among the motion information on layer 1, the texture information on layer 1, the unit information on layer 1 and the parameter information on layer 1.

The prediction module 235 for layer 1 may receive the motion information on layer 1 from the prediction module 275 for layer 0 and may perform motion prediction. The inter-layer motion prediction is also referred to as an inter-layer inter prediction. By the inter-layer motion prediction, prediction for the current block in the current layer (enhancement layer) may be performed using the motion information on the reference layer (base layer). If necessary, the prediction module 235 may scale and use the motion information on the reference layer.

The prediction module 235 for layer 1 may receive the texture information on layer 1 from the prediction module 275 for layer 0 and may perform texture prediction. The texture prediction is also referred to as an inter-layer intra prediction or intra base layer (BL) prediction. In the inter-layer texture prediction, a texture of a reference block in the reference layer may be used as a predictive value for the current block in the enhancement layer. Here, the texture of the reference block may be scaled by upsampling.

The prediction module 235 for layer 1 may receive unit parameter information on layer 1 from the prediction module 275 for layer 0 and may perform unit parameter prediction. By the unit parameter prediction, unit (CU, PU, and/or TU) information on the base layer may be used as unit information on the enhancement layer or unit information on the enhancement layer may be determined on the basis of the unit information on the base layer.

The prediction module 235 for layer 1 may receive filtering parameter information on layer 1 from the prediction module 275 for layer 0 and may perform parameter prediction. By the parameter prediction, a parameter used for the base layer may be derived to be reused for the enhancement layer or a parameter for the enhancement layer may be predicted on the basis of the parameter used for the base layer.

Adders 290 and 295 may construct a reconstructed block using the predicted block constructed by the prediction modules 235 and 275 and the residual block constructed by the inverse transform modules 230 and 270. In this case, the adders 290 and 295 may be considered as separate modules (reconstructed block constructing module) that construct a reconstructed block.

The block and/or picture reconstructed by the adders 290 and 295 may be supplied to the filtering modules 240 and 280.

The filtering modules 240 and 280 may apply a deblocking filter, an SAO, and/or an ALF to the reconstructed block and/or picture.

The filtering modules 240 and 280 may not apply all of the deblocking filter, the ALF and the SAO, but may apply only the deblocking filter, may apply only the deblocking filter and the ALF, or may apply only the deblocking filter and the SAO.

Referring to FIG. 2, the filtering module 240 for layer 1 may perform a filtering operation on the reconstructed picture using the parameter information transmitted from the prediction module 235 for layer 1 and/or the filtering module 280 for layer 1. For example, the filtering module 240 for layer 1 may perform a filtering operation on layer 1 or an inter-layer filtering operation using a parameter predicted from a filtering parameter applied to layer 0.

The memories 245 and 285 may store the reconstructed block or picture for use as a reference picture or reference block. The memories 245 and 285 may output the reconstructed picture stored in the memories 245 and 285 via a predetermined output module (not shown) or a display (not shown).

Although FIG. 2 illustrates the rearrangement modules, the dequantization modules and the inverse transform modules as independent modules, the video decoder may also be configured to enable the dequantization/inverse transform modules as a single module to sequentially perform rearrangement, dequantization, and inverse transform like the video encoder of FIG. 1.

Although FIGS. 1 and 2 illustrate the prediction modules, the prediction module for layer 1 may include an inter-layer prediction module that performs a prediction process using information on another layer (layer 0) and an inter/intra prediction module that performs a prediction process without using information on another layer (layer 0).

Figure 3:
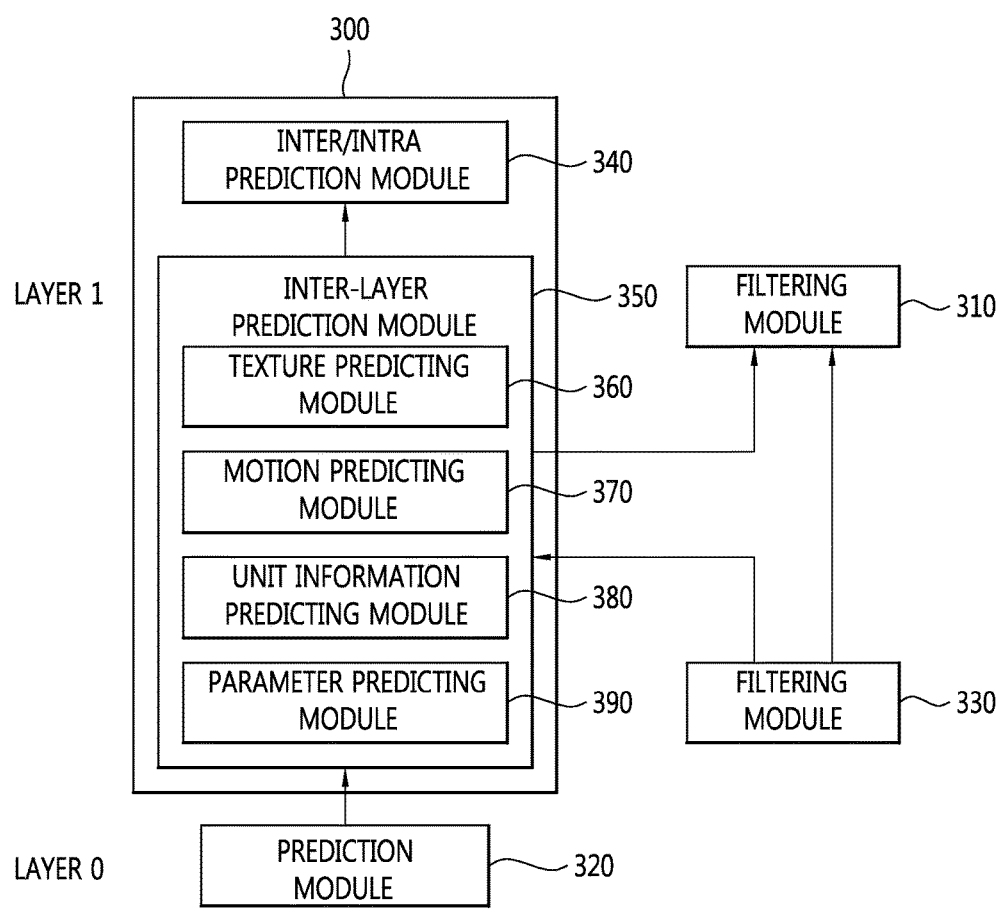
FIG. 3 is a block diagram illustrating an example of inter-layer prediction in a video encoder and in a video decoder that perform scalable coding according to the invention.

FIG. 3 is a block diagram illustrating an example of inter-layer prediction in a video encoder and a video decoder that perform scalable coding according to the invention.

Referring to FIG. 3, a prediction module 300 for layer 1 includes an inter/intra prediction module 340 and an inter-layer prediction module 350.

The prediction module 300 for layer 1 may perform inter-layer prediction necessary for predicting layer 1 from information on layer 0.

For example, the inter-layer prediction module 350 may receive the information on layer 0 from a prediction module 320 and/or a filtering module 330 for layer 0 and may perform inter-layer prediction necessary for predicting layer 1.

The inter/intra prediction module 340 for layer 1 may perform inter prediction or intra prediction using information on layer 1, without using the information on layer 0.

The inter/intra prediction module 340 for layer 1 may also perform prediction based on the information on layer 0 using information transmitted from the inter-layer prediction module 350.

In addition, a filtering module 310 for layer 1 may perform filtering on the basis of the information on layer 0 or may perform filtering on the basis of the information on layer 1. The information on layer 0 may be transmitted from the filtering module 330 for layer 0 to the filtering module 310 for layer 1 or may be transmitted from the inter-layer prediction module 350 for layer 1 to the filtering module 310 for layer 1.

Meanwhile, information transmitted from layer 0 to the inter-layer prediction module 350 may be at least one of information on a unit parameter of layer 0, motion information on layer 0, texture information on layer 0, and filter parameter information on layer 0.

For convenience of description, suppose that the inter-layer prediction module 350 has a sub-prediction module for predicting individual inter-layer information.

For instance, the inter-layer prediction module 350 may include a texture predicting module 360, a motion predicting module 370, a unit information predicting module 380 and a parameter predicting module 390.

The texture predicting module 360 may use a texture of a reference block in a reference layer as a predictive value for a current block in an enhancement layer when the reference block in the reference layer is reconstructed. Here, the texture predicting module 360 may scale the texture of the reference block using upsampling.

The motion predicting module 370 may conduct prediction for the current block in layer 1 (current layer or enhancement layer) using motion information on layer 0 (reference layer or base layer). Here, the motion predicting module 370 may scale the motion information on the reference layer.

The unit information predicting module 380 may derive unit (CU, PU, and/or TU) information on the base layer to be used as unit information on the enhancement layer or may determine unit information on the enhancement layer on the basis of the unit information on the base layer.

The parameter predicting module 390 may derive a parameter used for the base layer to be reused for the enhancement layer or may predict a parameter for the enhancement layer on the basis of the parameter used for the base layer.

Although inter-layer texture prediction, inter-layer motion prediction, inter-layer unit information prediction and inter-layer parameter prediction have been illustrated above as an inter-layer prediction, alternative inter-layer predictions may also be applicable to the present invention, without limiting thereto.

For example, the inter-layer prediction module may further include a sub-prediction module for conducting inter-layer residual prediction and/or a sub-prediction module for conducting inter-layer differential prediction, or a combination of the foregoing sub-prediction modules may conduct inter-layer residual prediction and inter-layer differential prediction.

If an encoder has a configuration illustrated in FIG. 3, in layer 1, the prediction module 300 may correspond to the prediction module 110 of FIG. 1, and the filtering module 310 may correspond to the filtering module 120 of FIG. 1. In layer 0, the prediction module 320 may correspond to the prediction module 140 of FIG. 1, and the filtering module 330 may correspond to the filtering module 150 of FIG. 1.

If a decoder has the configuration illustrated in FIG. 3, in layer 1, the prediction module 300 may correspond to the prediction module 235 of FIG. 2, and the filtering module 310 may correspond to the filtering module 240 of FIG. 2. In layer 0, the prediction module 320 may correspond to the prediction module 140 275 FIG. 2, and the filtering module 330 may correspond to the filtering module 280 of FIG. 2.

In scalable video coding, inter-layer prediction of predicting information on a current layer using information on another layer may be performed. As described with reference to FIGS. 1 to 3, motion prediction, texture prediction, unit prediction, the parameter prediction may be considered as examples of inter-layer prediction.

In order to use information on a reference layer (for example, texture information or motion information), it is necessary to specify a current block in a current layer and a reference block corresponding to the current block.

Figure 4:
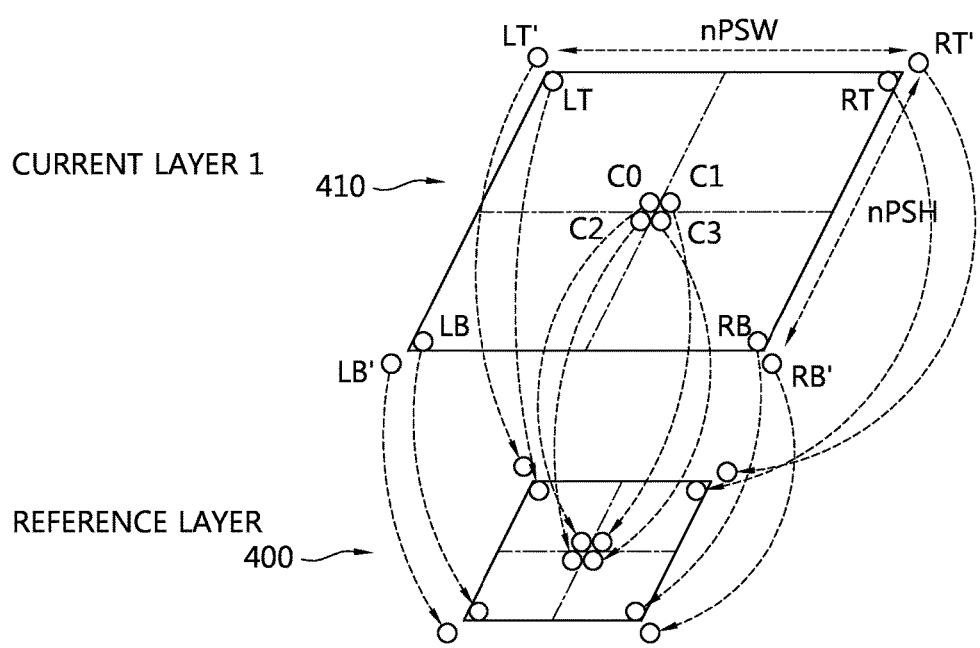
FIG. 4 is a diagram schematically illustrating a method of specifying a current block in a current layer and a reference block in a reference layer according to the invention.

FIG. 4 is a diagram schematically illustrating a method of specifying a current block in a current layer and a reference block in a reference layer according to the invention. FIG. 4 illustrates an example where the current layer is an upper layer of the reference layer and has a higher resolution than the reference layer.

Referring to FIG. 4, the current block 410 in the current layer may be specified by a predetermined position in the current layer, and the reference block 400 may be specified in the reference layer corresponding to the predetermined position. In FIG. 4, the current block may be a CU or PU.

Suppose that the position specifying the current block 410 is (xCurr, yCurr), and a position specifying the reference block in the reference layer corresponding to the current block is (xRef, yRef). Here, (xCurr, yCurr) may be a relative position from a top-left sample of the current picture. Also, (xRef, yRef) may be a relative position from a top left of a representation of a reference picture or reference layer.

When inter-layer prediction is performed on the current block, a predicted block for the current block may be constructed using information on a specified reference block as below.

In FIG. 4, nPSW is a width of the current block 410, and nPSH is a height of the current block 410.

The positions of the current block and the reference block may be specified by an encoder and a decoder or a specific module (for example, prediction module) in the encoder and the decoder. For convenience of description, a prediction module of the encoder and a prediction module of the decoder are illustrated in this example to specify the positions of the current block and the reference block.

That is, the prediction modules may specify (xCurr, yCurr) and (xRef, yRef).

The prediction modules may specify the current block and specify the reference block based on the position of the current block, thereby acquiring information on the reference block (for example, texture information or motion vector).

Here, the prediction module of the encoder may specify (xCurr, yCurr) and (xRef, yRef) and transmit position specifying information to the decoder, while the prediction module of the decoder may receive the position specifying information and derive (xCurr, yCurr) and (xRef, yRef).

In this case, the prediction module of the decoder may conduct inter-layer prediction on the current block specified by (xCurr, yCurr) using the information on the reference block specified by (xRef, yRef).

Determination of Position (xCurr, yCurr) Specifying Current Block

The position (xCurr, yCurr) specifying the current block in the current layer may be determined by any one of candidates (1) to (12).

(1) LT=(xP, yP)
(2) RT=(xP+nPSW−1, yP)
(3) LB=(xP, yP+nPSH−1)
(4) RB=(xP+nPSW−1, yP+nPSH−1)
(5) LT'=(xP−1, yP−1)
(6) RT'=(xP+nPSW, yP−1)
(7) LB'=(xP−1, yP+nPSH)
(8) RB'=(xP+nPSW, yP+nPSH)
(9) C0=(xP+(nPSW>>1)−1, yP+(nPSH>>1)−1)
(10) C1=(xP+(nPSW>>1), yP+(nPSH>>1)−1)
(11) C2=(xP+(nPSW>>1)−1, yP+(nPSH>>1))
(12) C3=(xP+(nPSW>>1), yP+(nPSH>>1))

The position (xCurr, yCurr) specifying the current block may be determined by any one of (1) to (12) to be fixedly used, or a position to be used as (xCurr, yCurr) may be determined through rate-distortion optimization (RDO) and signaled by the video encoder.

Alternatively, the same position corresponding to a position specifying a reference block (for example, PU or CU) in the reference layer (base layer) may be determined as the position (xCurr, yCurr) specifying the current block (for example, PU or CU) in the current layer (enhancement layer).

For example, when a position of a top-left sample in the reference block of the reference layer is used as the position specifying the reference block, a position of a top-left sample LT=(xP, yP) in the current block of the current layer may be determined as (xCurr, yCurr) for use.

Target Position (xRef, yRef) in Reference Layer

A position (position of the reference block) in the reference layer from which information necessary for predicting the current layer (for example texture information or motion information) is taken may be determined depending on a ratio between the current layer and the reference layer from the position of the current block.

Expression 1 represents a method of determining a position of a reference block from which the information necessary for predicting is taken in the reference layer according to the invention.

$$xRef = xCurr/scale$$

$$yRef = yCurr/scale \qquad \text{<Expression 1>}$$

Here, scale indicating a ratio of the current layer to the reference layer may be determined depending on the resolutions of the two layers. For example, when the resolution of the current layer is double the resolution of the reference layer, a scale value of 2 is applied. When the resolution of the current layer is 1.5 times the resolution of the reference layer, a scale value of 1.5 is applied. When the resolution of the current layer is equal to the resolution of the reference layer, a scale value of 1 is applied.

Although the scale is illustrated as the ratio in resolution between the current layer and the reference layer in this example, the invention is not limited thereto. The scale may be determined depending on a scalability type to be applied to the current layer and the reference layer. For example, the scale may be a picture size ratio or a frame rate ratio between the current layer and the reference layer.

Inter-layer Motion Prediction

Inter-layer motion prediction is also referred to as inter-layer inter prediction, and this specification may use inter-layer motion prediction mixed with inter-layer inter prediction, if necessary, for the purpose of easy understanding of the invention.

In inter-layer motion prediction, the current block in the current layer (enhancement layer) may be predicted using motion information on the reference layer (base layer).

Inter-layer motion prediction may be performed by the prediction module or the inter-layer prediction module illustrated in FIGS. 1 to 3. Hereinafter, for convenience of explanation, inter-layer motion prediction is described as being performed by the prediction module.

Figure 5:
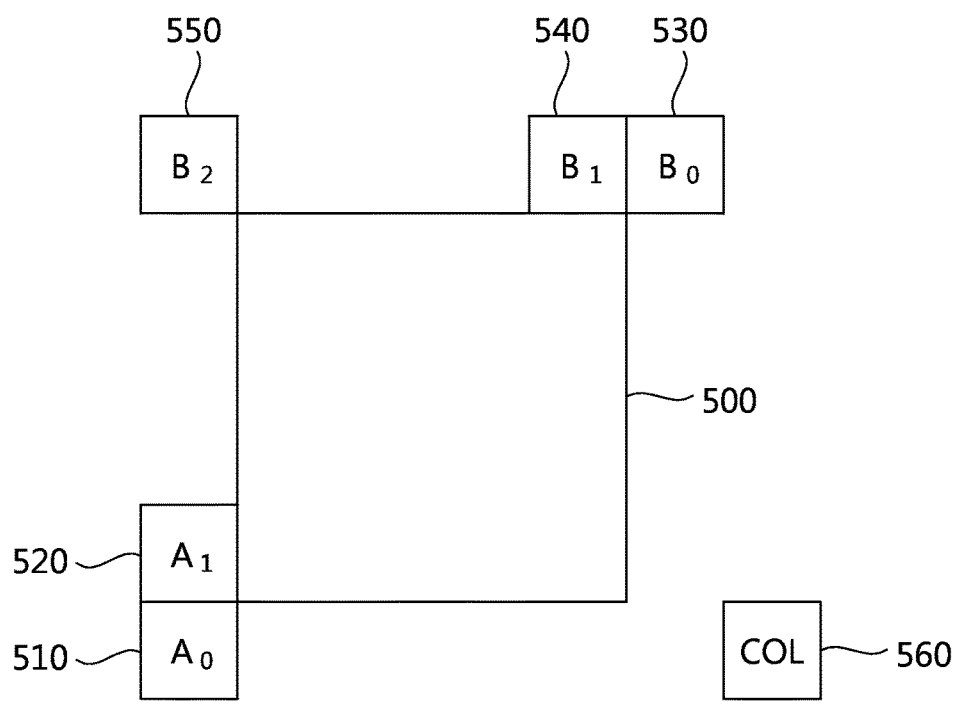
FIG. 5 briefly illustrates an example of candidates of motion information used to perform inter prediction within a layer without referring to another layer.

FIG. 5 is a diagram briefly illustrating an example of candidates of motion information used to perform inter prediction within a layer without referring to another layer (hereinafter, referred to as "inter prediction").

In FIG. 5, $A_0$, $A_1$, $B_0$, $B_1$, $B_2$, and COL may specify corresponding blocks or may specify motion information on the corresponding blocks. Here, the motion information on the corresponding blocks may be a motion vector or may be a motion vector and a reference picture index.

Here, an inter prediction method will be described using a base layer as an example.

Inter prediction in a base layer may be performed by the prediction module or the inter/intra prediction module illustrated in FIGS. 1 to 3. Hereinafter, for convenience of explanation, inter prediction is described as being performed by the prediction module.

Inter prediction modes include a merge mode, a skip mode, and a mode using a motion vector predictor (MVP). The mode using the MVP is referred to as an AMVP (advanced MVP) mode for convenience of explanation.

In the merge mode, motion information selected among motion information on neighboring blocks (hereinafter, referred to as motion information candidates) illustrated in FIG. 5 may be used as motion information on the current block. Information indicating a selected motion information candidate may be transmitted from the video encoder to the video decoder.

In the skip mode, motion information of a motion information candidate selected in the same way as in the merge mode is used as the motion information on the current block, without creating/transmitting a residual.

When the merge mode or the skip mode is applied, the prediction module may determine availability of spatial candidates $A_0$, $A_1$, $B_0$, $B_1$, and $B_2$ around the current block.

A merge candidate list may be constructed using candidates determined to be available including a COL candidate according to availability determination order.

The prediction module may perform inter prediction using motion information of a candidate among the merge candidate list indicated by information (for example, merge index merge_idx) transmitted from the encoder as motion information on the current block. For instance, the prediction module may use samples indicated by motion information of a candidate selected by a merge index as a predicted block of the current block.

When the AMVP mode is applied, the prediction module may also construct an AMVP list including MVP candidates.

For instance, the prediction module may determine availability of motion vectors of blocks in order of $A_0 \rightarrow A_1$ to select an MVP candidate A, and may determine availability of motion vectors of blocks in order of $B_0 \rightarrow B_1 \rightarrow B_2$ to select an MVP candidate B.

The prediction module may construct a candidate list as [A B] when both A and B are available and are different from each other, while the prediction module may construct a candidate list as [A COL] when all of A, B and COL as a motion vector of the COL block are available and A and B are the same.

When a number of candidates in the candidate list is smaller than 2 as a result of availability determination, the prediction module may add a zero (0) vector to adjust the number of candidates to 2.

The video encoder may transmit an MVP index indicating an MVP to be used in inter prediction of the current block in the AMVP list, a motion vector difference mvd of a motion vector, and a reference index indicating a reference picture for the current block in a reference picture list to the video decoder. The reference picture list is a list of reference pictures to be used in inter prediction and is classified into L0 for forward prediction and L1 for backward prediction.

The prediction module may construct a predicted block of the current block on the basis of the MVP indicated by the MVP index, the motion vector derived from mvd, and the reference picture indicated by the reference index.

When the predicted block is constructed by applying the merge mode/skip mode or the AMVP mode, the prediction module may construct a reconstructed block of the current block on the basis of the predicted block and a residual. When the skip mode is applied, the residual is not transmitted and thus the prediction module may use the predicted block as the reconstructed block.

Although the inter prediction method has been described with reference to the base layer as an example, inter prediction may also be performed in the same manner as described above on the enhancement layer without using information on another layer.

When inter prediction is performed on the base layer as described above, inter-layer motion prediction may be performed on the enhancement layer using the motion information on the base layer.

For example, an inter-layer prediction module for the enhancement layer may derive motion information on a reference layer on the basis of information transmitted from a prediction module for the reference layer. Alternatively, a prediction module for the enhancement layer may derive motion information on a reference layer on the basis of information transmitted from the video encoder.

Here, the prediction module may specify a position (xCurr, yCurr) of the current block and may acquire the motion information on the reference layer from a reference block specified by a corresponding position (xRef, yRef) in the reference layer.

The prediction module may predict the current block using motion information on the reference block as a candidate in the merge mode/skip mode or AMVP mode.

Here, the prediction module may scale the motion information on the reference block in the reference layer, that is, a motion vector of the reference layer, to be used for predicting the current block. That is, the prediction module may use the scale motion vector as a motion vector of the current block or as an MVP of the current block.

In detail, the prediction module may derive a motion vector at the position (xRef, yRef), that is, a motion vector of a block (reference block) covering the position (xRef, yRef), as mvRL. Here, the reference block may be a PU.

The prediction module may derive a reference index of the block (reference block) covering the position (xRef, yRef) as a reference index refIdxIL to be used for inter-layer motion prediction.

The prediction module may derive a motion vector mvIL to be used for inter-layer motion prediction (inter-layer inter prediction) by scaling mvRL.

Expression 2 represents a method of deriving mvIL by scaling mvRL according to the invention.

$$mvIL = scale * mvRL \qquad \text{<Expression 2>}$$

In Expression 2, scale represents a ratio of the current layer to the reference layer as in Expression 1. For example, when the resolution of the current layer is double the resolution of the reference layer, a scale value of 2 is applied. When the resolution of the current layer is 1.5 times the resolution of the reference layer, a scale value of 1.5 is applied.

When the resolution of the current layer is equal to the resolution of the reference layer, a scale value of 1 is applied, and the prediction module may use mvRL as mvIL.

Inter-layer Texture Prediction

Inter-layer texture prediction is also referred to as inter-layer intra prediction or intra base layer (BL) prediction. In this specification, the term of inter-layer texture intra prediction may be used along with the terms of texture prediction and intra BL for convenience of description.

In inter-layer texture prediction, in order to match a reconstructed picture of a base layer and a picture of an enhancement layer in size or resolution, the reconstructed picture of the base layer may be subjected to upsampling.

Upsampling may be carried out by applying interpolation.

When inter-layer texture prediction is applied, a texture of a reference block in the reference layer may be used as the predicted block of the current block in the current layer. Here, if a residual is not transmitted, the prediction module of the video decoder may use the texture of the reference block as a reconstructed texture of the current block.

In detail, the prediction module may use a texture of the reference block specified by (xRef, yRef) in the reference layer corresponding to the position (xCurr, yCurr) specifying the current block as a predictive value for the current block. That is, the texture of the reference block covering the position (xRef, yRef) in the reference layer may be used as the predictive value for the current block.

In this case, as described above, the prediction module may conduct upsampling on the texture of the reference block, for example, reconstructed samples.

Inter-layer Syntax Prediction

In inter-layer syntax prediction, the texture of the current block is predicted or generated using syntax information on the reference layer. Here, the syntax information on the reference layer used for predicting the current block may include information on an intra prediction mode, motion information, or the like.

For instance, although the reference layer may be a P slice or B slice, a reference block in the slice may be a block to which an intra prediction mode is applied. In this case, inter-layer prediction of generating/predicting the texture of the current layer using an intra mode of the syntax information on the reference layer may be performed. In detail, in a case where the reference layer is a P slice or B slice but a reference block in the slice is a block having to which the intra prediction mode is applied, if inter-layer syntax prediction is applied, intra prediction may be performed on the current block (1) in the intra prediction mode of the reference block (2) using a reference pixel around the current block in the current layer.

Here, the prediction module may use an intra prediction mode for the reference block specified by (xRef, yRef) in the reference layer corresponding to the position (xCurr, yCurr) specifying the current block as an intra prediction mode for the current block. That is, the intra prediction mode for the reference block covering the position (xRef, yRef) in the reference layer may be used as an intra prediction mode value for the current block.

Upsampling on Base Layer

Specifically, the video encoder may perform a process of downsampling an input picture so as to encode/decode the input picture by a plurality of divided layers having different resolutions.

Further, the video encoder/decoder may upsample a reconstructed picture of a lower layer so as to use the picture of the lower layer as a reference picture in encoding/decoding.

Figure 6:
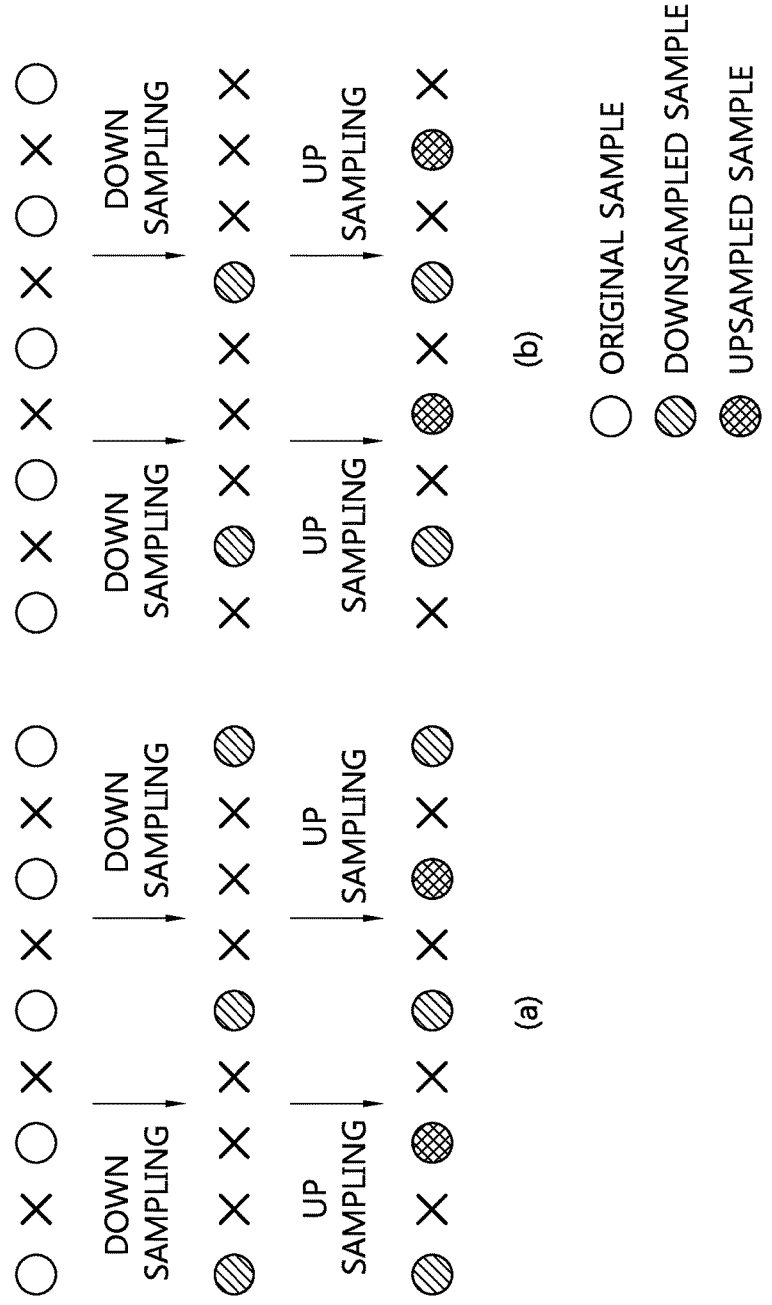
FIG. 6 schematically illustrates an example of rescaling (downsampling/upsampling) which is applied in an inter-layer intra prediction process according to the invention.

FIG. 6 schematically illustrates an example of rescaling (downsampling/upsampling) which is applied in a process of inter-layer intra prediction according to the invention.

FIG. 6(a) illustrates an example where a col-located integer sample is used as a downsampled sample.

FIG. 6(b) illustrates an example where a sample departing by ½ phase is generated and used without using a collocated integer sample.

Figure 7:
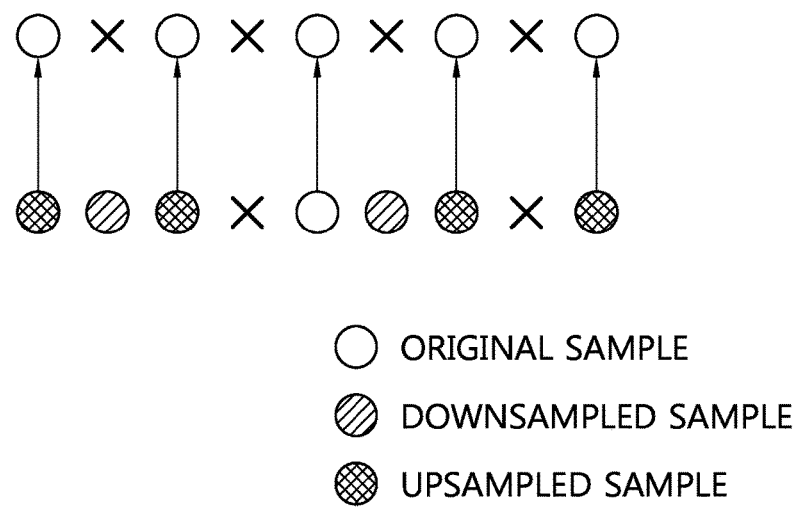
FIG. 7 is a diagram schematically illustrating an example of phase-shifted upsampling according to the invention.

FIG. 7 is a diagram schematically illustrating an example of phase-shifted upsampling according to the invention.

Lower samples in FIG. 7 represent together downsampled samples with a shift of ½ phase from original samples and samples upsampled from the downsampled samples.

Considering that inter-layer prediction is performed on the current layer, the downsampled samples may be samples in the base layer (reference layer), and the original samples may be samples in the enhancement layer (current layer).

The video encoder/decoder may upsample the samples in the reference layer according to the resolution of the current layer or a resolution ratio between the current layer and the reference layer to generate samples to be used for prediction or reconstruction of the current layer.

Adjustment of Resolutions (Sizes) of Reference Layer and Current Layer

A width and a length of an input picture need to be multiples of those of a smallest coding unit (SCU), respectively. For example, the SCU has a size of 8×8, the width and the length of the input picture may be multiples of 8, respectively.

When a size of the input picture is not a multiple of a size of the SCU, the size of the input picture is adjusted via padding. That is, the width and the length of the input picture are adjusted to multiples of those of the SCU by padding a sample.

In scalable video coding, pictures in each layer need to have a width and a length corresponding to multiples of those of the SCU so as to effectively perform coding.

In a case of spatial scalability, a lower layer and an upper layer have different resolutions (picture sizes).

Here, at least one of the lower layer and the upper layer may have a size which is not a multiple of the size of the SCU. For example, when the SCU is 8×8, a width and/or a length of the lower layer may not be a multiple of 8. Alternatively, when the SCU is 8×8, a width and/or a length of the upper layer may not be a multiple of 8.

In detail, when the lower layer has a 600×400 size and the upper layer has a 900×600 size, the two layers have spatial scalability with a resolution ratio of 1.5.

However, the lower layer has a width/length corresponding to multiples of 8, while the upper layer has a width which is not a multiple of 8. Thus, the width of the upper layer is adjusted to a multiple of 8 by padding a sample.

The adjusted upper layer has a size of 912×600 corresponding to multiples of 8. The video encoder and the video decoder may encode/decode the picture with the 912×600 size, and the video decoder may output the picture with the 900×600 size according to the size of the input picture when outputting the picture of the upper layer.

Although the foregoing example illustrates where the size of the upper layer is not a multiple of the size of the SCU, the size of the lower layer may not be a multiple of the size of the SCU instead. For instance, when the upper layer has a 960×540 size and the resolution ratio is 2, the lower layer has a 480×270 size. If the SCU has an 8×8 size, the size of the lower layer is not a multiple of the size of the SCU.

In this case, the size of the lower layer may also be adjusted to a multiple of the size of the SCU via padding or the like and then be encoded/decoded, and the decoder may output the picture of the lower layer to the 480×270 size corresponding to the input picture.

When a picture size of the upper layer or lower layer is adjusted to a multiple of the size of the SCU, there may be no position (or area) in the lower layer corresponding to a particular position (or particular area) of the upper layer. Alternatively, there may be no position (or area) in the upper layer corresponding to a particular position (or particular area) of the lower layer.

In detail, a position pRef of the lower layer corresponding to a particular position pCurr of the upper layer may be specified using scale as a scaling factor as described above. When coordinates of the position pCurr are (xCurr, yCurr) in the upper layer and coordinates of the position pRef are (xRef, yRef) in the lower layer, a relationship between pCurr and pRef may be represented by Expression 3.

$$(x\text{Ref},y\text{Ref})=(x\text{Curr}/\text{scale}X, y\text{Curr}/\text{scale}Y) \quad \text{<Expression 3>}$$

In Expression 3, scaleX may be an x-axis resolution ratio (width ratio) between the upper layer and the lower layer, and scaleY may be a y-axis resolution ratio (height ratio) between the upper layer and the lower layer.

Meanwhile, as described above, a position corresponding to (xCurr/scale, yCurr/scale) may be absent in the lower layer (reference layer). In this case, positions (xCurr/scale, yCurr/scale) out of the size of the lower layer may be adjusted to values within the lower layer by clipping.

Figure 8:
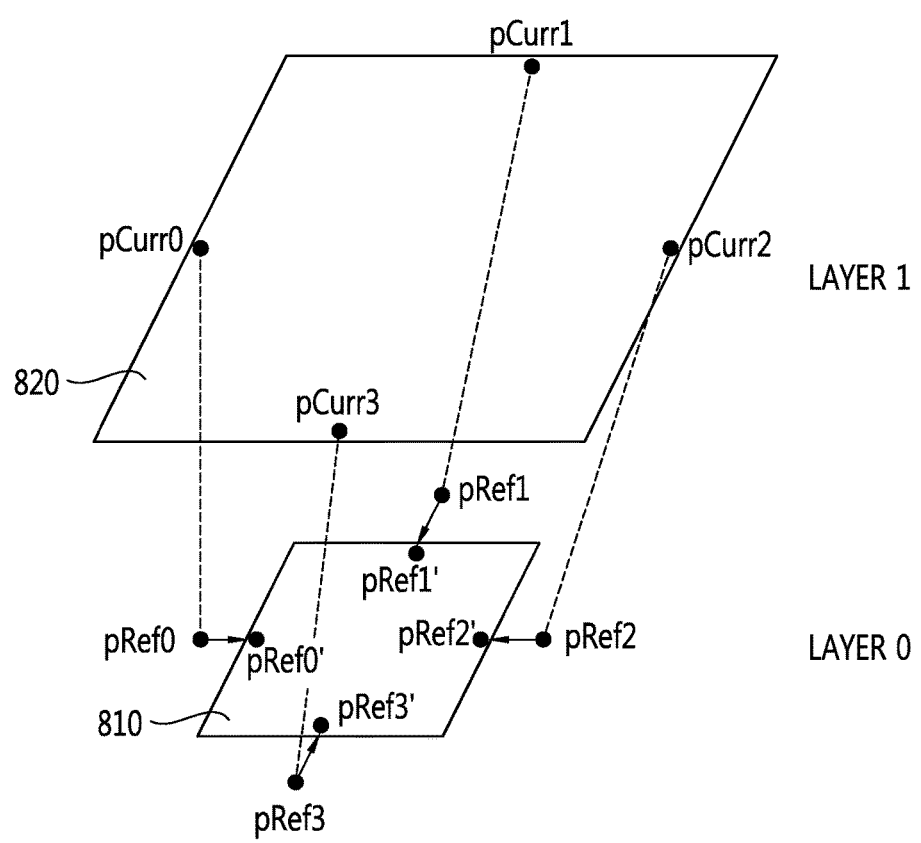
FIG. 8 is a diagram schematically illustrating an example of a method of adjusting a position of a lower layer corresponding to an upper layer.

FIG. 8 is a diagram schematically illustrating an example of a method of adjusting a position of a lower layer corresponding to an upper layer.

In FIG. 8, layer 0 is the lower layer, and layer 1 is the upper layer. The lower layer may be a base layer or reference layer, and the upper layer may be an enhancement layer or current layer.

Referring to FIG. 8, when a position pRef of the lower layer 810 corresponding to a position pCurr specifying a sample or block in the upper layer 820 is out of a region of the lower layer, the position pRef may be adjusted to be within the region of the lower layer 810 or corresponding to a size of the lower layer 810.

In the example shown in FIG. 8, pCurr0, pCur 1, pCurr2 and pCurr3 specify sample positions in the upper layer 820 as represented by Expression 4.

$$p\text{Curr}0=(x\text{Curr}0,y\text{Curr}0)$$

$$p\text{Curr}1=(x\text{Curr}1,y\text{Curr}1)$$

$$p\text{Curr}2=(x\text{Curr}2,y\text{Curr}2)$$

$$p\text{Curr}3=(x\text{Curr}3,y\text{Curr}3) \quad \text{<Expression 4>}$$

For convenience of description, as shown in FIG. 8, suppose that pCurr0 is positioned around a left boundary of the upper layer 820, pCurr1 is positioned around an upper boundary of the upper layer 820, pCurr2 is positioned around a right boundary of the upper layer 820, and pCur 3 is positioned around a lower boundary of the upper layer 820.

As described above, when a size of the upper layer is not a multiple of that of the SCU, a position (area) corresponding to a sample position (area) in the upper layer may be absent in the lower layer.

For example, referring to FIG. 8, pRef0 corresponding to pCurr0 may be absent in the lower layer 810, pRef1 corresponding to pCurr1 may be absent in the lower layer 810, pRef2 corresponding to pCurr2 may be absent in the lower layer 810, or pRef3 corresponding to pCurr3 may be absent in the lower layer 810.

Here, a relationship between pCurrI and pRefI (I=0, 1, 2, 3) is represented by Expression 5.

$$p\text{Curr}I=(x\text{Curr}I,y\text{Curr}I)$$

$$p\text{Ref}I=(x\text{Ref}I,y\text{Ref}I)$$

$$(x\text{Ref}I,y\text{Ref}I)=(x\text{Curr}I/\text{scale}X,y\text{Curr}I/\text{scale}Y) \quad \text{<Expression 5>}$$

Here, the encoder and the decoder may conduct clipping to adjust positions pRef out of the size of the lower layer to positions within the lower layer.

Specifically, xRef as an x-component of pRef and yRef as a y-component may be subjected to clipping as in Expression 6.

$$xRef = Clip3(0, xRef', xRef) \quad \text{<Expression 6>}$$
$$yRef = Clip3(0, yRef', yRef)$$

$$Clip3(x, y, z) = \begin{cases} x; & x < x \\ y; & z > y \\ z; & \text{otherwise} \end{cases}$$

In Expression 6, xRef' is an x coordinate in the lower layer 810. For example, when the lower layer has a width of Width_L, xRef' may be Width_L −1.

In Expression 6, yRef' is a y coordinate in the lower layer 810. For example, when the lower layer has a height of Height_L, yRef' may be Height_L −1.

Referring to FIG. 8, clipped positions pRef0', pRef1', pRef2' and pRef3' of the lower layer may be as follows.

$$p\text{Ref0}'=(0,y\text{Curr0}/\text{scale}Y)$$

$$p\text{Ref1}'=(x\text{Curr1}/\text{scale}X,0)$$

$$p\text{Ref2}'=(\text{width}\_L-1,y\text{Curr2}/\text{scale}Y)$$

$$p\text{Ref3}'=(x\text{Curr2}/\text{scale}X,\text{Height}\_L-1)$$

FIG. 8 illustrates the adjusting method when the position (area) corresponding to the particular position (area) of the upper layer is absent in the lower layer as the size of the upper layer is not a multiple of that of the SCU.

On the other hand, as a size of the lower layer is not a multiple of that of the SCU, a position (area) corresponding to a particular position (area) of the lower layer may be absent in the upper layer. Alternatively, as the size of the lower layer is not a multiple of that of the SCU, a particular position (particular area) of the upsampled lower layer, when the lower layer is upsampled, may be out of the size of the upper layer.

Figure 9:
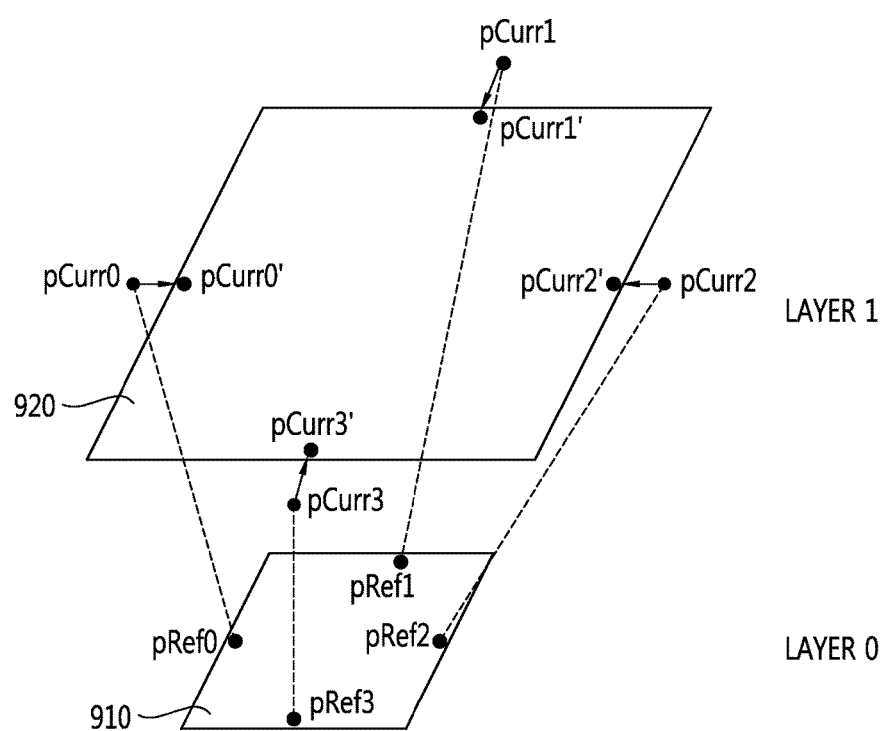
FIG. 9 is a diagram schematically illustrating an example of a method of adjusting a position of an upper layer corresponding to the lower layer or a position of a lower layer scaled to a resolution of the upper layer.

FIG. 9 is a diagram schematically illustrating an example of a method of adjusting a position of an upper layer corresponding to the lower layer or a position of a lower layer scaled to a resolution of the upper layer.

In FIG. 9, layer 0 is the lower layer, and layer 1 is the upper layer or the lower layer scaled to the resolution of the upper layer. The lower layer may be a base layer or reference layer, and the upper layer may be an enhancement layer or current layer.

Referring to FIG. 9, when a position pCurr in the upsampled lower layer corresponding to a position pRef specifying a sample or block in the lower layer 910 is out of a size of the upper layer, the position pCurr may be adjusted to be within the size of the upper layer 920 or corresponding to the size of the upper layer 920.

In the example shown in FIG. 9, pRef0, pRef1, pRef2 and pRef3 specify sample positions in the lower layer 910 as illustrated in Expression 7.

$$p\text{Ref0}=(x\text{Ref0},y\text{Ref0})$$

$$p\text{Ref1}=(x\text{Ref1},y\text{Ref1})$$

$$p\text{Ref2}=(x\text{Ref2},y\text{Ref2})$$

$$p\text{Ref3}=(x\text{Ref3},y\text{Ref3}) \quad \text{<Expression 7>}$$

For convenience of description, as shown in FIG. 9, suppose that pRef0 is positioned around a left boundary of the lower layer 910, pRef1 is positioned around an upper boundary of the lower layer 910, pRef2 is positioned around a right boundary of the lower layer 910, and pRef3 is positioned around a lower boundary of the lower layer 910.

As described above, when a size of the lower layer is not a multiple of that of the SCU, a position (area) in the scaled lower layer corresponding to a sample position (area) in the lower layer may be absent in the upper layer.

For example, referring to FIG. 9, pCurr0 corresponding to pRef0 may be absent in the upper layer 920, pCurr1 corresponding to pRef1 may be absent in the upper layer 920, pCurr2 corresponding to pRef2 may be absent in the upper layer 920, or pCurr3 corresponding to pRef3 may be absent in the upper layer 920.

pCurr0 is a position corresponding to pRef0 in the scaled lower layer, pCurr1 is a position corresponding to pRef1 in the scaled lower layer, pCurr2 is a position corresponding to pRef2 in the scaled lower layer, and pCurr3 is a position corresponding to pRef3 in the scaled lower layer.

Here, a relationship between pCurrI and pRefI (I=0, 1, 2, 3) is represented by Expression 8.

$$p\text{Curr}I=(x\text{Curr}I,y\text{Curr}I)$$

$$p\text{Ref}I=(x\text{Ref}I,y\text{Ref}I)$$

$$(x\text{Curr}I,y\text{Curr}I)=(x\text{Ref}*\text{scale}X,y\text{Ref}I*\text{scale}Y) \quad \text{<Expression 8>}$$

Here, the encoder and the decoder may conduct clipping to adjust positions pCurr out of the size of the upper layer to positions within the upper layer.

Specifically, xCurr as an x-component of pCurr and yCurr as a y-component may be subjected to clipping as in Expression 9.

$$xCurr = Clip3(0, xCurr', xCurr) \quad \text{<Expression 9>}$$
$$yCurr = Clip3(0, yCurr', yCurr)$$

-continued $$Clip3(x, y, z) = \begin{cases} x; & x < x \\ y; & z > y \\ z; & \text{otherwise} \end{cases}$$

In Expression 9, xCurr' is an x coordinate in the upper layer 920. For example, when the upper layer has a width of Width_U, xCurr' may be Width_U−1.

In Expression 9, yCurr' is a y coordinate in the upper layer 920. For example, when the upper layer has a height of Height_U, yCurr' may be Height_U−1.

Referring to FIG. 9, clipped positions pCurr0', pCurr1', pCurr2' and pCurr3' of the upper layer may be as follows.

$p\text{Curr0'}=(0,y\text{Ref0}*\text{scale}Y)$ $p\text{Curr1'}=(x\text{Ref1}*\text{scale}X,0)$ $p\text{Curr2'}=(\text{width\_}U{-}1,y\text{Ref2}*\text{scale}Y)$ $p\text{Curr3'}=(x\text{Ref2}*\text{scale}X,\text{Height\_}U{-}1)$ For convenience of description, FIG. 9 illustrates that pCurr0, pCurr1, pCurr2 and pCurr3 are positions in the scaled lower layer obtained by scaling pRef0, pRef1, pRef2 and pRef3 in the lower layer to the resolution of the upper layer, and pCurr0', pCurr1', pCurr2' and pCurr3' are positions in the upper layer obtained by adjusting (clipping) pCurr0, pCurr1, pCurr2 and pCurr3.

However, in FIG. 9, pCurr0, pCurr1, pCurr2 and pCurr3 ≅ may be positions in the upper layer corresponding to positions pRef0, pRef1, pRef2 and pRef3 in the lower layer, and pCurr0', pCurr1', pCurr2' and pCurr3' may be positions in the upper layer obtained by adjusting (clipping) pCurr0, pCurr1, pCurr2 and pCurr3.

Meanwhile, although FIGS. 8 and 9 illustrate the methods of clipping a position out of the regions of the layers to a position within the layers, a method of adding an offset by each layer may also be used instead.

Figure 10:
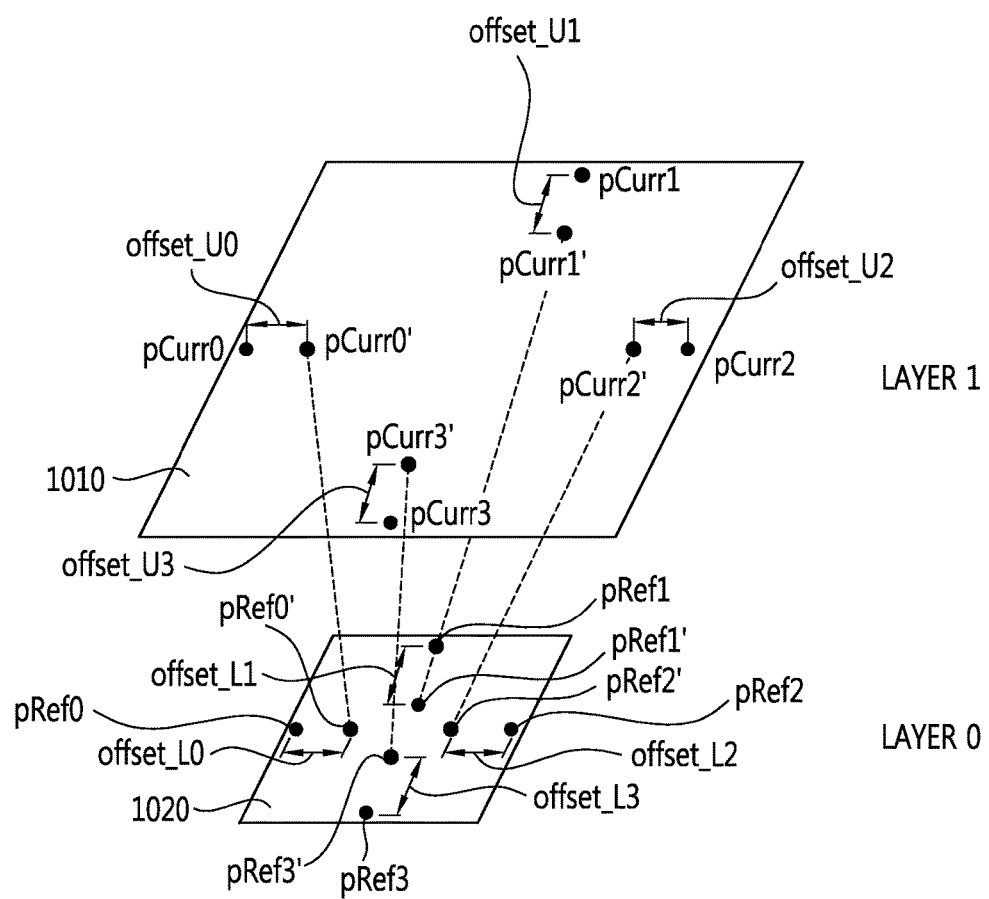
FIG. 10 is a diagram schematically illustrating an example of a method of adjusting corresponding positions of an upper layer and a lower layer using an offset.

FIG. 10 is a diagram schematically illustrating an example of a method of adjusting corresponding positions of an upper layer and a lower layer using an offset.

In FIG. 10, layer 0 is the lower layer, and layer 1 is the upper layer or the upsampled lower layer. The lower layer may be a base layer or reference layer, and the upper layer may be an enhancement layer or current layer.

Referring to FIG. 10, when a position pRef in the lower layer 1010 corresponding to a position pCurr specifying a sample or block in the upper layer 1020 is out of a region of the lower layer, the position pRef may be adjusted to be within the region of the lower layer 1010 or corresponding to a size of the lower layer 1010.

Also, when a position pCurr in the scaled lower layer corresponding to a position pRef specifying a sample or block in the lower layer 1010 is out of a size of the upper layer, the position pCurr may be adjusted to be within the size of the upper layer 1020 or corresponding to the size of the upper layer 1020.

In the example shown in FIG. 10, pCurr0, pCurr1, pCurr2 and pCurr3 specify sample positions in the upper layer 1020 as illustrated in Expression 10.

$p\text{Curr0}=(x\text{Curr0},y\text{Curr0})$ $p\text{Curr1}=(x\text{Curr1},y\text{Curr1})$ $p\text{Curr2}=(x\text{Curr2},y\text{Curr2})$ $p\text{Curr3}=(x\text{Curr3},y\text{Curr3})$ <Expression 10>

For convenience of description, as shown in FIG. 10, suppose that pCurr0 is positioned around a left boundary of the upper layer 1020, pCurr1 is positioned around an upper boundary of the upper layer 1020, pCurr2 is positioned around a right boundary of the upper layer 1020, and pCurr3 is positioned around a lower boundary of the upper layer 1020.

In the example shown in FIG. 10, pRef0, pRef1, pRef2 and pRef3 specify sample positions in the lower layer 1010 as illustrated in Expression 7.

$p\text{Ref0}=(x\text{Ref0},y\text{Ref0})$ $p\text{Ref1}=(x\text{Ref1},y\text{Ref1})$ $p\text{Ref2}=(x\text{Ref2},y\text{Ref2})$ $p\text{Ref3}=(x\text{Ref3},y\text{Ref3})$ <Expression 11>

For convenience, as shown in FIG. 10, suppose that pRef0 is positioned around a left boundary of the lower layer 1010, pRef1 is positioned around an upper boundary of the lower layer 1010, pRef2 is positioned around a right boundary of the lower layer 1010, and pRef3 is positioned around a lower boundary of the lower layer 1010.

As described above, when the size of the upper layer is not a multiple of that of the SCU, a position (area) corresponding to a sample position (area) in the upper layer may be absent in the lower layer.

Alternatively, when the size of the lower layer is not a multiple of that of the SCU, a particular position (particular area) in the scaled lower layer, when the lower layer is scaled, may be out of the size of the upper layer.

Thus, an offset is applied to each boundary of a layer so that a corresponding position or area may be present within a region of another layer. Further, an offset may be applied to a scaled layer so that the scaled layer may be within a size of a corresponding layer.

First, a case where an offset is applied to the upper layer 1020 so that the upper layer 1020 corresponds to the lower layer 1010 is described with reference to FIG. 10. Suppose that an offset applied to a left side of the upper layer is offset_U0, an offset applied to an upper side of the upper layer is offset_U1, an offset applied to a right side of the upper layer is offset_U2, and an offset applied to a lower side of the upper layer is offset_U3.

In this case, samples (positions) within a region reduced by the offsets from the boundaries of the upper layer correspond to the samples (positions) in the lower layer.

For example, positions between pCurr0 positioned on the boundary and offset_U0-applied pCurr0' are not matched to samples (positions) in the lower layer. Here, if a position in the lower layer 1010 corresponding to pCurr0' is pRef0' and samples between pRef0' and pRef0 need to be utilized, the samples between pRef0' and pRef0 may be padded.

Likewise, offset_U1 may be applied to pCurr1 to specify pCurr1', offset_U2 may be applied to pCurr2 to specify pCurr2', and offset_U3 may be applied to pCurr3 to specify pCurr3'.

Supposing a width of the upper layer as Width_U and a height thereof as Height_U, when the offsets are applied as described above, the upper layer is windowed in an area defined by (offset_U0, y), (x, offset_U1), (Width_U−1−offset_U2, y) and (x, Height_U−1−offset_U3).

When boundaries of the windowed area in the upper layer do not match the boundaries corresponding to the lower layer, samples may be padded in an area between the boundaries.

Here, the offsets offset_U0, offset_U1, offset_U2 and offset_U3 may be set so that a predetermined gap is present between the boundaries of the scaled upper layer and the boundaries of the lower layer.

Although the case where the offset is applied to the upper layer 1020 so that the upper layer 1020 corresponds to the lower layer 1010 has been illustrated herein, the present invention is not limited thereto. Alternatively, the upper layer may be scaled to correspond to the lower layer, after which an offset may be applied.

Meanwhile, an offset may be applied to the lower layer 1010 so that the lower layer 1010 corresponds to the upper layer 1020. Suppose that an offset applied to a left side of the lower layer is offset_L0, an offset applied to an upper side of the lower layer is offset_L1, an offset applied to a right side of the lower layer is offset_L2, and an offset applied to a lower side of the lower layer is offset_L3.

In this case, samples (positions) within a region reduced by the offsets from the boundaries of the lower layer correspond to the samples (positions) in the upper layer.

For example, positions between pRef0 positioned on the boundary and offset_U0-applied pRef0' are not matched to samples (positions) in the upper layer. Here, if a position in the upper layer 1020 corresponding to pRef0' is pCurr0' and samples between pCurr0' and pCurr0 need to be utilized, the samples between pCurr0' and pCurr0 may be padded.

Likewise, offset_L1 may be applied to pRef1 to specify pRef1', offset_L2 may be applied to pRef2 to specify pRef2', and offset_L3 may be applied to pRef3 to specify pRef3'.

Supposing a width of the lower layer as Width_L and a height thereof as Height_L, when the offsets are applied as described above, the lower layer is windowed in an area defined by (offset_L0, y), (x, offset_L1), (Width_L−1−offset_L2, y) and (x, Height_L−1−offset_L3).

When boundaries of the windowed area in the lower layer do not match the boundaries corresponding to the lower layer, samples may be padded in an area between the boundaries.

Here, the offsets offset_L0, offset_L1, offset_L2 and offset_L3 may be set so that a predetermined gap is present between the boundaries of the scaled lower layer and the boundaries of the upper layer.

Although the case where the offset is applied to the lower layer 1010 so that the lower layer 1010 corresponds to the upper layer 1020 has been illustrated herein, the present invention is not limited thereto. Alternatively, the lower layer may be scaled to correspond to the upper layer, after which an offset may be applied.

Figure 11:
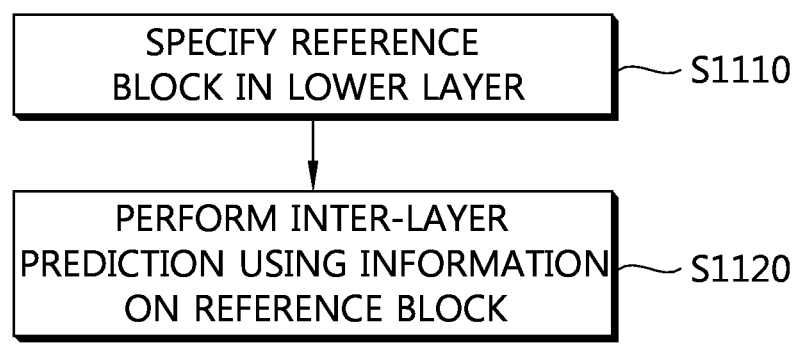
FIG. 11 is a flowchart schematically illustrating a method of performing inter-layer prediction according to the invention.

FIG. 11 is a flowchart schematically illustrating a method of performing inter-layer prediction according to the invention. Here, for convenience of description, operations in FIG. 11 are described as being carried out by a prediction module of an encoder and/or a prediction module of a decoder.

Referring to FIG. 11, the prediction module may specify a reference block in a lower layer (S1110). The lower layer may be referred to as a reference layer or base layer, and the reference block may be specified corresponding to a current block in an upper layer. The upper layer may be referred to as a current layer or enhancement layer.

The prediction module may specify the current block in the upper layer and then may specify the corresponding reference block in the lower layer. For example, the prediction module may specify a position in the current layer specifying the current block and may derive a position in the reference layer corresponding to the specified position in the current layer, thereby specifying the reference block.

Hereinafter, the position in the current layer specifying the current block is referred to as a current position, and the position in the reference layer corresponding to the current position is referred to as a reference position.

In the foregoing examples, the current position may correspond to pCurr or pCurr', and the reference position may correspond to pRef or pRef'.

Here, a corresponding relationship in position or area between the upper layer and the lower layer may be specified as illustrated in FIGS. 8 to 10.

For instance, when the reference position is out of a size range of the reference layer, the prediction module may adjust the reference position to be within the size range of the reference layer. Alternatively, when the reference position is out of the size range of the reference layer, the prediction module may adjust the reference position to be on a boundary of the reference layer.

Also, when a position in the reference layer scaled to a resolution of the current layer corresponding to the reference position is out of a size range of the current layer, the prediction module may adjust the position corresponding to the reference position to be within the size range of the current layer.

While FIGS. 8 and 9 illustrate methods of adjusting these positions by clipping, the present invention is not limited thereto. The positions may also be adjusted by methods of matching corresponding points disposed out of a layer to positions within the layer.

The prediction module may adjust the positions by applying an offset to a boundary of a layer.

For example, the prediction module may specify the reference position in a region of the reference layer corresponding to an area defined by applying an offset to boundaries of the current layer. Here, the region of the reference layer may be specified by scaling the area defined by applying offsets to the boundaries of the current layer.

Moreover, the prediction module may scale an area, defined by applying offsets to boundaries of the reference layer, to the resolution of the current layer and may specify the reference position in the scaled area.

The reference position may be scaled based on a resolution ratio between the two layers with a relationship represented by Expression 5 or Expression 8.

The prediction module may perform inter-layer prediction using information on the reference block (S1120). When inter-layer texture prediction is performed, the prediction module may scale or upsample a reconstructed texture of the reference block specified in S1110 to the resolution of the current layer. Here, the prediction module may use the upsampled or scaled texture of the reference block as a predicted block of the current block.

When inter-layer inter prediction is performed, the prediction module may use motion information (motion vector and/or reference index) on the reference block specified in S1110 as motion information or a motion information candidate for the current block.

When the motion information on the reference block is used as motion information for the current block, the prediction module may use a reference index and a motion vector of the reference block as a reference index and a motion vector for the current block. Further, the prediction module may use the motion vector of the reference block as an MVP for the current block. In this case, the prediction module may add a motion vector differential value for the current block and the MVP to derive a motion vector of the current block and may specify a reference picture for the current block using the signaled reference index, thereby predicting the current block.

Figure 12:
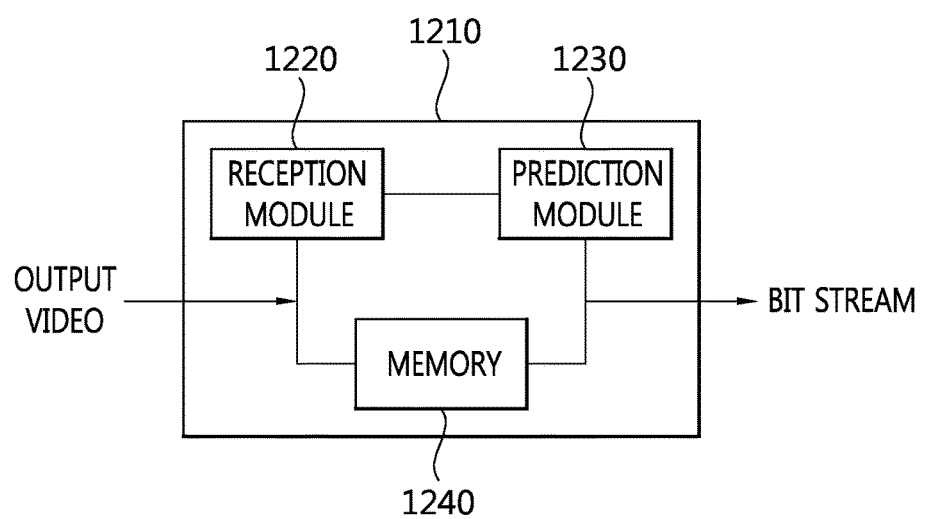
FIG. 12 is a diagram schematically illustrating a decoder that decodes a current layer according to the invention.

FIG. 12 is a diagram schematically illustrating a decoder that decodes a current layer according to the invention.

Referring to FIG. 12, the decoder 1210 includes a reception module 1220, a prediction module 1230 and a memory 1240.

The reception module 1220 receives a bitstream including video information on a multilayer or upper layer. The memory 1240 may store information necessary for predicting and reconstructing a current block, for example, a reconstructed picture prior to the current block and/or related parameter information.

The prediction module 1230 may conduct prediction for a current layer (prediction for the current block) using video information on a reference layer.

Here, a reference block may be specified on the basis of a reference position in the reference layer corresponding to a current position in the current layer for specifying the current block.

The prediction module 1230, as described above, may specify the reference block by matching the upper layer and a lower layer. For example, when the reference position is out of a size range of the reference layer, the prediction module 1230 may adjust the reference position to be within the size range of the reference layer.

Also, when a position corresponding to the reference position in the reference layer scaled to a resolution of the current layer is out of a size range of the current layer, the prediction module 1230 may adjust the position corresponding to the reference position to be within the size range of the current layer.

In addition, the prediction module 1230 may specify a reference position in a region of the reference layer corresponding to an area defined by applying an offset to boundaries of the current layer. Also, the prediction module 1230 may scale an area, defined by applying an offset to boundaries of the reference layer, to the resolution of the current layer and may specify a reference position in the scaled area.

Although FIG. 12 illustrates the decoder including the reception module, the prediction module and the memory for convenience of description, the decoder of FIG. 12 may correspond to the decoder of FIG. 2.

For instance, the decoder of FIG. 12 may further include part or all of the modules shown in FIG. 2.

Further, the memory 1240 of FIG. 12 may correspond to the two memories of FIG. 2, the prediction module 1230 of FIG. 12 may correspond to the two prediction modules of FIG. 2, and the reception module 1220 of FIG. 12 may correspond to the DEMUX of FIG. 2. Here, the prediction module 1230 of FIG. 12 may be interpreted as conducting functions of the other modules than the DEMUX and the memories of FIG. 2.

In addition, the decoder of FIG. 12 may be interpreted as corresponding to the decoding module 210 for layer 1 in FIG. 2 in the same corresponding manner as mentioned for the decoder of FIG. 2.

Figure 13:
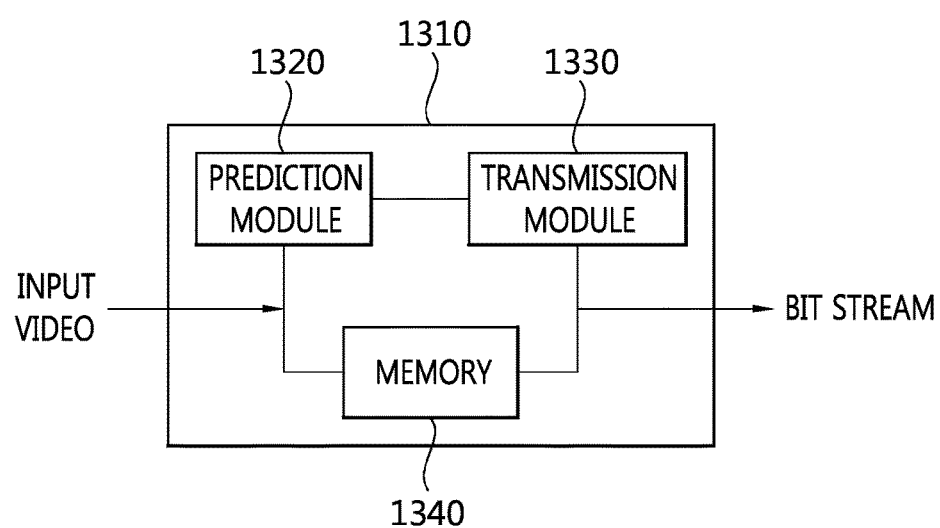
FIG. 13 is a diagram schematically illustrating an encoder that encodes a current layer according to the invention.

FIG. 13 is a diagram schematically illustrating an encoder that encodes a current layer according to the invention.

Referring to FIG. 13, the encoder 1310 includes a prediction module 1320, a transmission module 1330 and a memory 1340.

The prediction module 1320 may conduct prediction for a current layer (current block) using video information on a reference layer.

The memory 1340 may store information necessary for predicting and reconstructing the current block, for example, a reconstructed picture prior to the current block and/or related parameter information. The transmission module 1330 may transmit information on a multilayer or upper layer including predicted information as a bitstream.

The prediction module 1320 may conduct prediction for the current layer (current block) using video information on the reference layer.

Here, a reference block may be specified on the basis of a reference position in the reference layer corresponding to a current position in the current layer for specifying the current block.

The prediction module 1320, as described above, may specify the reference block by matching the upper layer and a lower layer. For example, when the reference position is out of a size range of the reference layer, the prediction module 1320 may adjust the reference position to be within the size range of the reference layer.

Also, when a position corresponding to the reference position in the reference layer scaled to a resolution of the current layer is out of a size range of the current layer, the prediction module 1320 may adjust the position corresponding to the reference position to be within the size range of the current layer.

In addition, the prediction module 1320 may specify a reference position in a region of the reference layer corresponding to an area defined by applying an offset to boundaries of the current layer. Also, the prediction module 1320 may scale an area, defined by applying an offset to boundaries of the reference layer, to the resolution of the current layer and may specify a reference position in the scaled area.

Although FIG. 13 illustrates the encoder including the transmission module, the prediction module and the memory for convenience of description, the encoder of FIG. 13 may correspond to the encoder of FIG. 1.

For instance, the encoder of FIG. 13 may further include part or all of the modules shown in FIG. 1.

Further, the memory 1340 of FIG. 13 may correspond to the two memories of FIG. 1, the prediction module 1320 of FIG. 13 may correspond to the two prediction modules of FIG. 1, and the transmission module 1330 of FIG. 13 may correspond to the MUX of FIG. 1. Here, the prediction module 1320 of FIG. 13 may be interpreted as conducting functions of the other modules than the MUX and the memories of FIG. 1.

In addition, the encoder of FIG. 13 may be interpreted as corresponding to the encoding module 110 for layer 1 in FIG. 1 in the same corresponding manner as mentioned for the decoder of FIG. 1.

For convenience of description, a block or picture size has been expressed with integers N and M, for example, simply N×M, while a block or picture size N×M may refer to N×M samples or N×M pixels.

Also, an array of samples reconstructed at a particular time (for example picture order count (POC) or access unit (AU)) by each layer in multilayer structure supporting scalable video coding is represented as "picture."

Here, an entire sample array which has been reconstructed or is to be reconstructed at a particular time in a decoded and output layer (current layer) may be defined as a picture to be distinguished from a sample array in a reference layer which has been reconstructed or is to be reconstructed. A sample array which has been reconstructed or is to be reconstructed at a particular time in the reference layer may be referred to as a representation, a reference layer picture, a reference layer sample array, a reference layer texture, or the like. In this case, a single decoded (encoded) picture reconstructed in the current layer may be output with respect to a single AU.

While the methods in the above-mentioned exemplary system have been described on the basis of flowcharts including a series of steps or blocks, the invention is not limited to the order of steps and a certain step may be performed in a step or an order other than described above or at the same time as described above. The above-mentioned embodiments may include various examples. Therefore, the invention includes all substitutions, corrections, and modifications belonging to the appended claims.

The invention claimed is:

1. An inter-layer prediction method comprising:
specifying, by a decoding apparatus, a reference block in a reference layer;
predicting, by the decoding apparatus, a current block in a current layer using information on the reference block in the reference layer; and
reconstructing, by the decoding apparatus, the current layer based on the predicted current block,
wherein the specifying of the reference block comprises:
deriving a reference region in the reference layer when a size of the reference layer is not a multiple of a size of the smallest coding unit, wherein the reference region is derived by applying offsets from boundaries of the reference layer, wherein a size of the reference region is a multiple of the size of the smallest coding unit, wherein the reference region is used for inter-layer prediction of the current layer;
deriving a reference position in the reference layer, wherein the reference position corresponds to a current position in the current layer for specifying the current block;
when the reference position is out of the reference region, clipping is performed on the reference position to a boundary of the reference region; and
specifying the reference block based on the clipped reference position.

2. The inter-layer prediction method according to claim 1, further comprising:
adjusting a size of the current layer to a multiple of the size of the smallest coding unit in the current layer by padding when the size of the current layer is not a multiple of the size of the smallest coding unit.

3. The inter-layer prediction method according to claim 1, wherein the clipped the reference position is calculated based on the following equation, $$xRef=Clip3\ (0,\ xRef',\ xRef)$$

$$yRef=Clip3\ (0,\ yRef',\ yRef)$$

where, xRef denotes a x-component of the reference position, xRef' denotes a x-component of the boundary of the reference region, yRef denotes a y-component of the reference position and yRef' denotes a y-component of the boundary of the reference region.

4. The inter-layer prediction method according to claim 1, wherein the specifying of the reference block comprises specifying the reference position by scaling an x-component of the current position on the basis of a width ratio between the current layer and the reference layer and scaling a y-component of the current position on the basis of a height ratio between current layer and the reference layer.

5. The inter-layer prediction method according to claim 1, wherein the predicting comprises generating a predicted block of the current block using motion information on the reference block specified by the reference position.

6. The inter-layer prediction method according to claim 1, wherein the predicting comprises upsampling a texture of the reference block specified by the reference position and using the upsampled texture as a texture of a predicted block of the current block.

7. A decoder comprising:
a reception module, implemented with a processor, to receive a bit stream comprising video information on a multilayer;
a prediction module, implemented with the processor, to perform prediction for a video of a current layer using video information on a reference layer; and
a memory to store information necessary for the prediction,
wherein the prediction module is configured to:
derive a reference region in the reference layer when a size of the reference layer is not a multiple of a size of the smallest coding unit, wherein the reference region is derived by applying offsets from boundaries of the reference layer, wherein a size of the reference region is a multiple of the size of the smallest coding unit, wherein the reference region is used for inter-layer prediction of the current layer,
derive a reference position in the reference layer, wherein the reference position corresponds to a current position in the current layer for specifying a current block,
when the reference position is out of the reference region, clipping is performed on the reference position to a boundary of the reference region,
predict the current block using information on a reference block in the reference layer,
reconstruct the current layer based on the predicted current block, and
the reference block is specified based on the clipped reference position.

8. The decoder of claim 7, wherein the prediction module is configured to:
adjust a size of the current layer to a multiple of the size of the smallest coding unit in the current layer by padding when the size of the current layer is not a multiple of the size of the smallest coding unit.

9. The decoder of claim 7, wherein the clipped the reference position is calculated based on the following equation, $$xRef=Clip3\ (0,\ xRef',\ xRef)$$

$$yRef=Clip3\ (0,\ yRef',\ yRef)$$

where, xRef denotes a x-component of the reference position, xRef' denotes a x-component of the boundary of the reference region, yRef denotes a y-component of the reference position and yRef' denotes a y-component of the boundary of the reference region.

10. An encoder comprising:
a prediction module, implemented with a processor, to perform prediction for a video of a current layer using video information on a reference layer;
a memory to store information necessary for the prediction; and
a transmission module, implemented with the processor, to transmit a bit stream of a multilayer comprising predicted information,
wherein the prediction module is configured to:
derive a reference region in the reference layer when a size of the reference layer is not a multiple of a size of the smallest coding unit, wherein the reference region is derived by applying offsets from boundaries of the reference layer, wherein a size of the reference region is a multiple of the size of the smallest coding unit, wherein the reference region is used for inter-layer prediction of the current layer, derive a reference position in the reference layer, wherein the reference position corresponds to a current position in the current layer for specifying a current block, when the reference position is out of the reference region, clipping is performed on the reference position to a boundary of the reference region, predict the current block using information on a reference block in the reference layer, reconstruct the current layer based on the predicted current block, and the reference block is specified based on the clipped reference position.

11. The encoder of claim 10, wherein the prediction module is configured to:

adjust a size of the current layer to a multiple of the size of the smallest coding unit in the current layer by padding when the size of the current layer is not a multiple of the size of the smallest coding unit.

12. The encoder of claim 10, wherein the clipped the reference position is calculated based on the following equation, $$xRef = Clip3\ (0,\ xRef',\ xRef)$$

$$yRef = Clip3\ (0,\ yRef',\ yRef)$$

where, xRef denotes a x-component of the reference position, xRef' denotes a x-component of the boundary of the reference region, yRef denotes a y-component of the reference position and yRef' denotes a y-component of the boundary of the reference region.

* * * * *